(12) United States Patent
Hein et al.

(10) Patent No.: US 8,990,323 B2
(45) Date of Patent: Mar. 24, 2015

(54) DEFINING A SOCIAL NETWORK MODEL IMPLIED BY COMMUNICATIONS DATA

(75) Inventors: Brian Hein, Pacifica, CA (US); Jon New, San Mateo, CA (US)

(73) Assignee: Yahoo! Inc., Sunnyvale, CA (US)

( * ) Notice: Subject to any disclaimer, the term of this patent is extended or adjusted under 35 U.S.C. 154(b) by 498 days.

(21) Appl. No.: 13/272,160

(22) Filed: Oct. 12, 2011

(65) Prior Publication Data

US 2012/0089690 A1    Apr. 12, 2012

Related U.S. Application Data

(60) Provisional application No. 61/392,441, filed on Oct. 12, 2010.

(51) Int. Cl.
*G06F 15/16* (2006.01)
*G06Q 10/10* (2012.01)

(52) U.S. Cl.
CPC .............. *G06Q 10/107* (2013.01); *G06Q 10/10* (2013.01)
USPC ........... 709/206; 709/204; 709/223; 705/319; 707/758

(58) Field of Classification Search
CPC ....... G06Q 10/107; G06Q 50/01; H04L 67/22
USPC .................. 709/204, 206, 223–224; 705/319; 707/758
See application file for complete search history.

(56) References Cited

U.S. PATENT DOCUMENTS

| | | | |
|---|---|---|---|
| 5,610,915 A | 3/1997 | Elliott et al. | |
| 6,285,999 B1 | 9/2001 | Page | |
| 6,385,644 B1 | 5/2002 | Devine et al. | |
| 6,405,197 B2 | 6/2002 | Gilmour | |
| 6,510,453 B1 | 1/2003 | Apfel et al. | |
| 6,560,620 B1 | 5/2003 | Ching | |

(Continued)

FOREIGN PATENT DOCUMENTS

| | | |
|---|---|---|
| JP | 2003006116 | 1/2003 |
| JP | 2007249307 | 9/2007 |

(Continued)

OTHER PUBLICATIONS

Android-Tips.com, "Android Tips & Tricks: How to Import Contacts into Android Phone," located at http://android-tips.com/how-to-import-contacts-into-android/, Nov. 17, 2008 (document provided includes third-party comments submitted under the USPTO PeerToPatent program).

(Continued)

*Primary Examiner* — Oanh Duong
(74) *Attorney, Agent, or Firm* — James J. DeCarlo; Greenberg Traurig, LLP

(57) ABSTRACT

Systems and methods to define a social network for a user using data implied by communications of the user with others. In one embodiment, a method includes scanning a set of messages (e.g., emails to and from a user of a client device) to identify a plurality of primary persons addressed in the messages as a primary recipient and to identify a plurality of secondary persons addressed in the messages as a secondary recipient; mapping the primary persons to a plurality of friends and mapping the secondary persons to a plurality of other persons; and defining a social network model based on the friends and other persons, wherein the model comprises a friends category including the friends and an all category including the friends and other persons.

8 Claims, 6 Drawing Sheets

(56) References Cited

U.S. PATENT DOCUMENTS

| | | |
|---|---|---|
| 6,615,348 B1 | 9/2003 | Gibbs |
| 6,721,748 B1 | 4/2004 | Knight et al. |
| 6,931,419 B1 | 8/2005 | Lindquist |
| 6,952,805 B1 | 10/2005 | Tafoya et al. |
| 6,965,918 B1 | 11/2005 | Arnold et al. |
| 6,996,777 B2 | 2/2006 | Hipakka |
| 7,076,533 B1 | 7/2006 | Knox et al. |
| 7,085,745 B2 | 8/2006 | Klug |
| 7,103,806 B1 | 9/2006 | Horvitz |
| 7,181,518 B1 | 2/2007 | Matsumoto et al. |
| 7,246,045 B1 | 7/2007 | Rappaport et al. |
| 7,289,614 B1 | 10/2007 | Twerdahl et al. |
| 7,359,894 B1 | 4/2008 | Liebman et al. |
| 7,444,323 B2 | 10/2008 | Martinez et al. |
| 7,454,464 B2* | 11/2008 | Puthenkulam et al. ....... 709/204 |
| 7,475,113 B2 | 1/2009 | Stolze |
| 7,512,788 B2 | 3/2009 | Choi et al. |
| 7,536,384 B2 | 5/2009 | Venkataraman et al. |
| 7,539,676 B2 | 5/2009 | Aravamudan |
| 7,580,363 B2 | 8/2009 | Sorvari et al. |
| 7,593,995 B1 | 9/2009 | He et al. |
| 7,606,860 B2* | 10/2009 | Puthenkulam et al. ....... 709/204 |
| 7,627,598 B1 | 12/2009 | Burke |
| 7,639,157 B1 | 12/2009 | Whitley et al. |
| 7,653,695 B2 | 1/2010 | Flury et al. |
| 7,692,653 B1 | 4/2010 | Petro et al. |
| 7,698,140 B2 | 4/2010 | Bhardwaj et al. |
| 7,707,509 B2 | 4/2010 | Naono et al. |
| 7,716,140 B1* | 5/2010 | Nielsen et al. ................ 705/319 |
| 7,724,878 B2 | 5/2010 | Timmins et al. |
| 7,725,492 B2 | 5/2010 | Sittig et al. |
| 7,743,051 B1 | 6/2010 | Kashyap et al. |
| 7,756,895 B1 | 7/2010 | Emigh |
| 7,756,935 B2 | 7/2010 | Gaucas |
| 7,761,436 B2* | 7/2010 | Norton et al. ................. 707/705 |
| 7,788,260 B2 | 8/2010 | Lunt |
| 7,805,492 B1 | 9/2010 | Thatcher |
| 7,818,396 B2 | 10/2010 | Dolin et al. |
| 7,827,208 B2 | 11/2010 | Bosworth |
| 7,827,265 B2 | 11/2010 | Cheever et al. |
| 7,836,045 B2 | 11/2010 | Schachter |
| 7,836,134 B2 | 11/2010 | Pantalone |
| 7,849,141 B1 | 12/2010 | Bellegarda et al. |
| 7,849,142 B2 | 12/2010 | Clegg et al. |
| 7,853,602 B2 | 12/2010 | Gorti et al. |
| 7,853,881 B1 | 12/2010 | Aly Assal et al. |
| 7,865,562 B2 | 1/2011 | Nesbitt et al. |
| 7,870,197 B2 | 1/2011 | Lewis et al. |
| 7,899,806 B2 | 3/2011 | Aravamudan |
| 7,908,647 B1 | 3/2011 | Polis et al. |
| 7,925,690 B2 | 4/2011 | Smith et al. |
| 7,930,430 B2 | 4/2011 | Thatcher et al. |
| 7,949,611 B1* | 5/2011 | Nielsen et al. ................ 705/319 |
| 7,949,627 B2 | 5/2011 | Aravamudan |
| 7,970,832 B2 | 6/2011 | Perry, Jr. et al. |
| 7,996,456 B2 | 8/2011 | Gross |
| 8,005,806 B2 | 8/2011 | Rupp et al. |
| 8,073,928 B2 | 12/2011 | Dolin et al. |
| 8,086,676 B2 | 12/2011 | Palahnuk et al. |
| 8,086,968 B2 | 12/2011 | McCaffrey et al. |
| 8,140,566 B2 | 3/2012 | Boerries et al. |
| 8,145,791 B2 | 3/2012 | Thatcher et al. |
| 8,151,358 B1 | 4/2012 | Herold |
| 8,200,808 B2 | 6/2012 | Ishida |
| 8,239,197 B2 | 8/2012 | Webb et al. |
| 8,244,848 B1 | 8/2012 | Narayanan et al. |
| 8,363,803 B2 | 1/2013 | Gupta |
| 8,365,235 B2 | 1/2013 | Hunt et al. |
| 8,412,174 B2 | 4/2013 | Khosravi |
| 8,423,545 B2 | 4/2013 | Cort et al. |
| 8,433,762 B1 | 4/2013 | Wald et al. |
| 8,443,441 B2 | 5/2013 | Stolfo et al. |
| 8,468,168 B2 | 6/2013 | Brezina et al. |
| 8,495,045 B2 | 7/2013 | Wolf et al. |
| 8,522,257 B2 | 8/2013 | Rupp et al. |
| 8,549,412 B2 | 10/2013 | Brezina et al. |
| 8,600,343 B2 | 12/2013 | Brezina et al. |
| 8,606,335 B2 | 12/2013 | Ozaki |
| 8,620,935 B2 | 12/2013 | Rubin et al. |
| 8,661,002 B2 | 2/2014 | Smith et al. |
| 8,666,035 B2 | 3/2014 | Timmins et al. |
| 8,694,633 B2 | 4/2014 | Mansfield et al. |
| 8,745,060 B2 | 6/2014 | Brezina et al. |
| 8,793,625 B2 | 7/2014 | Rhee et al. |
| 2001/0049628 A1 | 12/2001 | Icho |
| 2002/0024536 A1 | 2/2002 | Kahan et al. |
| 2002/0049751 A1 | 4/2002 | Chen et al. |
| 2002/0054587 A1 | 5/2002 | Baker et al. |
| 2002/0059402 A1 | 5/2002 | Belanger |
| 2002/0059418 A1 | 5/2002 | Bird et al. |
| 2002/0059425 A1 | 5/2002 | Belfiore et al. |
| 2002/0073011 A1 | 6/2002 | Brattain et al. |
| 2002/0076004 A1 | 6/2002 | Brockenbrough et al. |
| 2002/0078090 A1 | 6/2002 | Hwang et al. |
| 2002/0087647 A1 | 7/2002 | Quine et al. |
| 2002/0103873 A1 | 8/2002 | Ramanathan et al. |
| 2002/0103879 A1 | 8/2002 | Mondragon |
| 2002/0107991 A1 | 8/2002 | Maguire et al. |
| 2002/0116396 A1 | 8/2002 | Somers et al. |
| 2002/0143871 A1 | 10/2002 | Meyer et al. |
| 2002/0163539 A1 | 11/2002 | Srinivasan |
| 2002/0194502 A1 | 12/2002 | Sheth et al. |
| 2003/0028525 A1 | 2/2003 | Santos et al. |
| 2003/0037116 A1 | 2/2003 | Nolan et al. |
| 2003/0041030 A1 | 2/2003 | Mansfield |
| 2003/0093483 A1 | 5/2003 | Allen et al. |
| 2003/0114956 A1 | 6/2003 | Cullen et al. |
| 2003/0120608 A1 | 6/2003 | Pereyra |
| 2003/0142125 A1 | 7/2003 | Salmimaa et al. |
| 2003/0204439 A1 | 10/2003 | Cullen, III |
| 2003/0220978 A1 | 11/2003 | Rhodes |
| 2003/0220989 A1 | 11/2003 | Tsuji et al. |
| 2003/0233419 A1 | 12/2003 | Beringer |
| 2004/0002903 A1 | 1/2004 | Stolfo et al. |
| 2004/0034537 A1 | 2/2004 | Gengarella et al. |
| 2004/0039630 A1 | 2/2004 | Begole et al. |
| 2004/0068545 A1 | 4/2004 | Daniell et al. |
| 2004/0100497 A1 | 5/2004 | Quillen et al. |
| 2004/0128355 A1 | 7/2004 | Chao et al. |
| 2004/0128356 A1 | 7/2004 | Bernstein et al. |
| 2004/0133561 A1 | 7/2004 | Burke |
| 2004/0153504 A1 | 8/2004 | Hutchinson et al. |
| 2004/0162878 A1 | 8/2004 | Lewis et al. |
| 2004/0177048 A1 | 9/2004 | Klug |
| 2004/0186851 A1 | 9/2004 | Jhingan et al. |
| 2004/0202117 A1 | 10/2004 | Wilson et al. |
| 2004/0205002 A1 | 10/2004 | Layton |
| 2004/0215726 A1 | 10/2004 | Arning et al. |
| 2004/0260756 A1 | 12/2004 | Forstall et al. |
| 2004/0268229 A1 | 12/2004 | Paoli et al. |
| 2005/0015432 A1 | 1/2005 | Cohen |
| 2005/0027779 A1 | 2/2005 | Schinner |
| 2005/0044152 A1 | 2/2005 | Hardy et al. |
| 2005/0055409 A1 | 3/2005 | Alsarraf et al. |
| 2005/0055639 A1 | 3/2005 | Fogg |
| 2005/0060638 A1 | 3/2005 | Mathew et al. |
| 2005/0076090 A1 | 4/2005 | Thuerk |
| 2005/0091272 A1 | 4/2005 | Smith et al. |
| 2005/0091314 A1 | 4/2005 | Blagsvedt et al. |
| 2005/0102361 A1 | 5/2005 | Winjum et al. |
| 2005/0131888 A1 | 6/2005 | Tafoya et al. |
| 2005/0138070 A1 | 6/2005 | Huberman et al. |
| 2005/0138631 A1 | 6/2005 | Bellotti et al. |
| 2005/0159970 A1 | 7/2005 | Buyukkokten et al. |
| 2005/0164704 A1 | 7/2005 | Winsor |
| 2005/0165584 A1 | 7/2005 | Boody et al. |
| 2005/0165893 A1 | 7/2005 | Feinberg et al. |
| 2005/0188028 A1 | 8/2005 | Brown et al. |
| 2005/0198159 A1 | 9/2005 | Kirsch |
| 2005/0198299 A1 | 9/2005 | Beck et al. |
| 2005/0203929 A1 | 9/2005 | Hazarika et al. |
| 2005/0213511 A1 | 9/2005 | Reece, Jr. et al. |
| 2005/0216300 A1 | 9/2005 | Appelman et al. |
| 2005/0222890 A1 | 10/2005 | Cheng et al. |

(56) References Cited

U.S. PATENT DOCUMENTS

| | | |
|---|---|---|
| 2005/0228881 A1 | 10/2005 | Reasor et al. |
| 2005/0228899 A1 | 10/2005 | Wendkos et al. |
| 2005/0235224 A1 | 10/2005 | Arend et al. |
| 2005/0278317 A1 | 12/2005 | Gross et al. |
| 2006/0004892 A1 | 1/2006 | Lunt |
| 2006/0004914 A1 | 1/2006 | Kelly et al. |
| 2006/0015533 A1 | 1/2006 | Wolf et al. |
| 2006/0020398 A1 | 1/2006 | Vernon et al. |
| 2006/0031340 A1 | 2/2006 | Mathew et al. |
| 2006/0031775 A1 | 2/2006 | Sattler et al. |
| 2006/0047747 A1 | 3/2006 | Erickson et al. |
| 2006/0053199 A1 | 3/2006 | Pricken et al. |
| 2006/0056015 A1 | 3/2006 | Nishiyama |
| 2006/0059151 A1 | 3/2006 | Martinez et al. |
| 2006/0059238 A1 | 3/2006 | Slater et al. |
| 2006/0064431 A1 | 3/2006 | Kishore et al. |
| 2006/0064434 A1 | 3/2006 | Gilbert et al. |
| 2006/0065733 A1 | 3/2006 | Lee et al. |
| 2006/0075046 A1 | 4/2006 | Yozell-Epstein et al. |
| 2006/0085752 A1 | 4/2006 | Beadle et al. |
| 2006/0095502 A1 | 5/2006 | Lewis et al. |
| 2006/0101350 A1 | 5/2006 | Scott |
| 2006/0123357 A1 | 6/2006 | Okamura |
| 2006/0136494 A1 | 6/2006 | Oh |
| 2006/0173824 A1 | 8/2006 | Bensky et al. |
| 2006/0179415 A1 | 8/2006 | Cadiz et al. |
| 2006/0195474 A1 | 8/2006 | Cadiz et al. |
| 2006/0217116 A1 | 9/2006 | Cassett et al. |
| 2006/0224675 A1 | 10/2006 | Fox et al. |
| 2006/0242536 A1 | 10/2006 | Yokokawa et al. |
| 2006/0248151 A1 | 11/2006 | Belakovskiy et al. |
| 2006/0256008 A1 | 11/2006 | Rosenberg |
| 2006/0281447 A1 | 12/2006 | Lewis et al. |
| 2006/0282303 A1 | 12/2006 | Hale et al. |
| 2007/0005702 A1 | 1/2007 | Tokuda et al. |
| 2007/0005715 A1 | 1/2007 | LeVasseur et al. |
| 2007/0005750 A1 | 1/2007 | Lunt et al. |
| 2007/0022447 A1 | 1/2007 | Arseneau et al. |
| 2007/0038720 A1 | 2/2007 | Reding et al. |
| 2007/0060328 A1 | 3/2007 | Zrike et al. |
| 2007/0071187 A1 | 3/2007 | Apreutesei et al. |
| 2007/0083651 A1 | 4/2007 | Ishida |
| 2007/0088687 A1 | 4/2007 | Bromm et al. |
| 2007/0115991 A1 | 5/2007 | Ramani et al. |
| 2007/0123222 A1 | 5/2007 | Cox et al. |
| 2007/0129977 A1 | 6/2007 | Forney |
| 2007/0143414 A1 | 6/2007 | Daigle |
| 2007/0162432 A1 | 7/2007 | Armstrong et al. |
| 2007/0174304 A1 | 7/2007 | Shrufi et al. |
| 2007/0174432 A1 | 7/2007 | Rhee et al. |
| 2007/0177717 A1 | 8/2007 | Owens et al. |
| 2007/0185844 A1 | 8/2007 | Schachter |
| 2007/0192490 A1 | 8/2007 | Minhas |
| 2007/0214141 A1 | 9/2007 | Sittig |
| 2007/0218900 A1 | 9/2007 | Abhyanker |
| 2007/0255794 A1 | 11/2007 | Coutts |
| 2007/0271527 A1 | 11/2007 | Paas et al. |
| 2007/0288578 A1 | 12/2007 | Pantalone |
| 2007/0294428 A1 | 12/2007 | Guy et al. |
| 2008/0005247 A9 | 1/2008 | Khoo |
| 2008/0005249 A1 | 1/2008 | Hart |
| 2008/0031241 A1 | 2/2008 | Toebes et al. |
| 2008/0037721 A1 | 2/2008 | Yao et al. |
| 2008/0040370 A1 | 2/2008 | Bosworth |
| 2008/0040435 A1 | 2/2008 | Buschi et al. |
| 2008/0040474 A1 | 2/2008 | Zuckerberg |
| 2008/0040475 A1 | 2/2008 | Bosworth |
| 2008/0055263 A1 | 3/2008 | Lemay et al. |
| 2008/0056269 A1 | 3/2008 | Madhani et al. |
| 2008/0065701 A1 | 3/2008 | Lindstrom et al. |
| 2008/0071872 A1 | 3/2008 | Gross |
| 2008/0077614 A1 | 3/2008 | Roy |
| 2008/0104052 A1 | 5/2008 | Ryan et al. |
| 2008/0113674 A1 | 5/2008 | Baig |
| 2008/0114758 A1 | 5/2008 | Rupp et al. |
| 2008/0119201 A1 | 5/2008 | Kolber et al. |
| 2008/0120411 A1 | 5/2008 | Eberle |
| 2008/0122796 A1 | 5/2008 | Jobs et al. |
| 2008/0134081 A1 | 6/2008 | Jeon et al. |
| 2008/0147639 A1 | 6/2008 | Hartman et al. |
| 2008/0162347 A1 | 7/2008 | Wagner |
| 2008/0162649 A1 | 7/2008 | Lee et al. |
| 2008/0162651 A1 | 7/2008 | Madnani |
| 2008/0163164 A1 | 7/2008 | Chowdhary et al. |
| 2008/0170158 A1 | 7/2008 | Jung et al. |
| 2008/0172464 A1 | 7/2008 | Thattai et al. |
| 2008/0216092 A1 | 9/2008 | Serlet |
| 2008/0220752 A1 | 9/2008 | Forstall et al. |
| 2008/0222279 A1 | 9/2008 | Cioffi et al. |
| 2008/0222546 A1 | 9/2008 | Mudd et al. |
| 2008/0235353 A1 | 9/2008 | Cheever et al. |
| 2008/0242277 A1 | 10/2008 | Chen et al. |
| 2008/0270038 A1* | 10/2008 | Partovi et al. .................. 702/19 |
| 2008/0270939 A1 | 10/2008 | Mueller |
| 2008/0275748 A1 | 11/2008 | John |
| 2008/0275865 A1 | 11/2008 | Kretz et al. |
| 2008/0293403 A1 | 11/2008 | Quon et al. |
| 2008/0301166 A1 | 12/2008 | Sugiyama et al. |
| 2008/0301175 A1 | 12/2008 | Applebaum et al. |
| 2008/0301245 A1 | 12/2008 | Estrada et al. |
| 2008/0307066 A1 | 12/2008 | Amidon et al. |
| 2008/0319943 A1 | 12/2008 | Fischer |
| 2009/0005076 A1 | 1/2009 | Forstall et al. |
| 2009/0010353 A1 | 1/2009 | She et al. |
| 2009/0029674 A1 | 1/2009 | Brezina et al. |
| 2009/0030872 A1 | 1/2009 | Brezina et al. |
| 2009/0030919 A1 | 1/2009 | Brezina et al. |
| 2009/0030927 A1* | 1/2009 | Cases et al. .................. 707/102 |
| 2009/0030933 A1 | 1/2009 | Brezina et al. |
| 2009/0030940 A1 | 1/2009 | Brezina et al. |
| 2009/0031232 A1 | 1/2009 | Brezina et al. |
| 2009/0031244 A1 | 1/2009 | Brezina et al. |
| 2009/0031245 A1 | 1/2009 | Brezina et al. |
| 2009/0041224 A1 | 2/2009 | Bychkov et al. |
| 2009/0048994 A1 | 2/2009 | Applebaum et al. |
| 2009/0054091 A1 | 2/2009 | van Wijk et al. |
| 2009/0070412 A1 | 3/2009 | D'Angelo |
| 2009/0077026 A1 | 3/2009 | Yanagihara |
| 2009/0083278 A1 | 3/2009 | Zhao et al. |
| 2009/0100384 A1 | 4/2009 | Louch |
| 2009/0106415 A1 | 4/2009 | Brezina et al. |
| 2009/0106676 A1 | 4/2009 | Brezina et al. |
| 2009/0111495 A1 | 4/2009 | Sjolin et al. |
| 2009/0119678 A1 | 5/2009 | Shih et al. |
| 2009/0157717 A1 | 6/2009 | Palahnuk et al. |
| 2009/0171930 A1 | 7/2009 | Vaughan et al. |
| 2009/0174680 A1 | 7/2009 | Anzures et al. |
| 2009/0177754 A1 | 7/2009 | Brezina et al. |
| 2009/0182788 A1 | 7/2009 | Chung et al. |
| 2009/0191899 A1 | 7/2009 | Wilson et al. |
| 2009/0198688 A1 | 8/2009 | Venkataraman et al. |
| 2009/0209286 A1 | 8/2009 | Bentley et al. |
| 2009/0213088 A1 | 8/2009 | Hardy et al. |
| 2009/0228555 A1 | 9/2009 | Joviak et al. |
| 2009/0234925 A1 | 9/2009 | Seippel, III et al. |
| 2009/0249198 A1 | 10/2009 | Davis et al. |
| 2009/0271370 A1 | 10/2009 | Jagadish et al. |
| 2009/0271409 A1 | 10/2009 | Ghosh |
| 2009/0300127 A1 | 12/2009 | Du |
| 2009/0300546 A1 | 12/2009 | Kwok et al. |
| 2009/0306981 A1 | 12/2009 | Cromack et al. |
| 2009/0313573 A1 | 12/2009 | Paek et al. |
| 2009/0319329 A1 | 12/2009 | Aggarwal et al. |
| 2009/0328161 A1* | 12/2009 | Puthenkulam et al. ............ 726/4 |
| 2010/0009332 A1 | 1/2010 | Yaskin et al. |
| 2010/0030715 A1 | 2/2010 | Eustice et al. |
| 2010/0036833 A1 | 2/2010 | Yeung et al. |
| 2010/0049534 A1 | 2/2010 | Whitnah |
| 2010/0062753 A1 | 3/2010 | Wen et al. |
| 2010/0083182 A1 | 4/2010 | Liu et al. |
| 2010/0088340 A1* | 4/2010 | Muller et al. .................. 707/783 |
| 2010/0094863 A1* | 4/2010 | Kenton-Dau et al. ......... 707/722 |
| 2010/0094869 A1 | 4/2010 | Ebanks |
| 2010/0131447 A1 | 5/2010 | Creutz et al. |

(56) References Cited

U.S. PATENT DOCUMENTS

| | | | |
|---|---|---|---|
| 2010/0153832 A1 | 6/2010 | Markus et al. | |
| 2010/0158214 A1 | 6/2010 | Gravino et al. | |
| 2010/0161547 A1 | 6/2010 | Carmel et al. | |
| 2010/0162171 A1 | 6/2010 | Felt et al. | |
| 2010/0164957 A1 | 7/2010 | Lindsay | |
| 2010/0167700 A1 | 7/2010 | Brock et al. | |
| 2010/0169327 A1 | 7/2010 | Lindsay | |
| 2010/0174784 A1 | 7/2010 | Levey et al. | |
| 2010/0185610 A1 | 7/2010 | Lunt | |
| 2010/0191844 A1 | 7/2010 | He et al. | |
| 2010/0198836 A1* | 8/2010 | Glass et al. | 707/748 |
| 2010/0228560 A1 | 9/2010 | Balasaygun et al. | |
| 2010/0229096 A1 | 9/2010 | Maiocco et al. | |
| 2010/0229223 A1 | 9/2010 | Shepard | |
| 2010/0235375 A1 | 9/2010 | Sidhu et al. | |
| 2010/0241579 A1 | 9/2010 | Bassett et al. | |
| 2010/0241580 A1* | 9/2010 | Schleier-Smith | 705/319 |
| 2010/0250682 A1 | 9/2010 | Goldberg et al. | |
| 2010/0281535 A1 | 11/2010 | Perry, Jr. et al. | |
| 2010/0306185 A1 | 12/2010 | Smith | |
| 2010/0318614 A1 | 12/2010 | Sager et al. | |
| 2010/0330972 A1 | 12/2010 | Angiolillo | |
| 2011/0010423 A1 | 1/2011 | Thatcher et al. | |
| 2011/0072052 A1* | 3/2011 | Skarin et al. | 707/794 |
| 2011/0078259 A1 | 3/2011 | Rashad et al. | |
| 2011/0086627 A1 | 4/2011 | Khosravi | |
| 2011/0087969 A1 | 4/2011 | Hein et al. | |
| 2011/0145192 A1 | 6/2011 | Quintela et al. | |
| 2011/0145219 A1 | 6/2011 | Cierniak et al. | |
| 2011/0173274 A1 | 7/2011 | Sood | |
| 2011/0173547 A1 | 7/2011 | Lewis et al. | |
| 2011/0191337 A1 | 8/2011 | Cort et al. | |
| 2011/0191340 A1 | 8/2011 | Cort et al. | |
| 2011/0191717 A1* | 8/2011 | Cort et al. | 715/816 |
| 2011/0219317 A1 | 9/2011 | Thatcher | |
| 2011/0225170 A1* | 9/2011 | Obasanjo et al. | 707/748 |
| 2011/0225293 A1 | 9/2011 | Rathod | |
| 2011/0231407 A1 | 9/2011 | Gupta et al. | |
| 2011/0235790 A1 | 9/2011 | Strope et al. | |
| 2011/0252383 A1 | 10/2011 | Miyashita | |
| 2011/0276396 A1 | 11/2011 | Rathod | |
| 2011/0282905 A1 | 11/2011 | Polis et al. | |
| 2011/0291933 A1 | 12/2011 | Holzer et al. | |
| 2011/0298701 A1 | 12/2011 | Holzer et al. | |
| 2012/0017158 A1 | 1/2012 | Maguire et al. | |
| 2012/0054681 A1 | 3/2012 | Cort et al. | |
| 2012/0079023 A1 | 3/2012 | Tejada-Gamero et al. | |
| 2012/0084461 A1 | 4/2012 | Athias et al. | |
| 2012/0089678 A1 | 4/2012 | Cort et al. | |
| 2012/0110080 A1 | 5/2012 | Panyam et al. | |
| 2012/0110096 A1 | 5/2012 | Smarr et al. | |
| 2012/0150970 A1 | 6/2012 | Peterson et al. | |
| 2012/0150978 A1 | 6/2012 | Monaco et al. | |
| 2012/0150979 A1 | 6/2012 | Monaco | |
| 2012/0166999 A1 | 6/2012 | Thatcher et al. | |
| 2012/0198348 A1 | 8/2012 | Park | |
| 2012/0246065 A1 | 9/2012 | Yarvis et al. | |
| 2012/0271822 A1 | 10/2012 | Schwendimann et al. | |
| 2012/0330658 A1 | 12/2012 | Bonforte | |
| 2012/0330980 A1 | 12/2012 | Rubin et al. | |
| 2012/0331418 A1 | 12/2012 | Bonforte | |
| 2013/0007627 A1 | 1/2013 | Monaco | |
| 2013/0014021 A1 | 1/2013 | Bau et al. | |
| 2013/0080915 A1 | 3/2013 | Lewis et al. | |
| 2013/0135314 A1* | 5/2013 | Haggerty et al. | 345/440 |
| 2013/0246931 A1 | 9/2013 | Harris et al. | |
| 2014/0011481 A1 | 1/2014 | Kho | |
| 2014/0081914 A1 | 3/2014 | Smith et al. | |
| 2014/0081964 A1 | 3/2014 | Rubin et al. | |
| 2014/0087687 A1 | 3/2014 | Brezina et al. | |
| 2014/0089304 A1 | 3/2014 | Rubin et al. | |
| 2014/0089411 A1 | 3/2014 | Rubin et al. | |
| 2014/0095433 A1 | 4/2014 | Cort et al. | |
| 2014/0100861 A1 | 4/2014 | Ledet | |
| 2014/0156650 A1 | 6/2014 | Jacobson | |
| 2014/0207761 A1 | 7/2014 | Brezina et al. | |
| 2014/0280097 A1 | 9/2014 | Lee et al. | |
| 2014/0287786 A1 | 9/2014 | Ismail et al. | |

FOREIGN PATENT DOCUMENTS

| | | |
|---|---|---|
| KR | 20060056015 | 5/2006 |
| KR | 1020090068819 | 6/2009 |
| KR | 1020090112257 | 10/2009 |
| KR | 1020020060386 | 8/2012 |
| KR | 1020090115239 | 8/2012 |
| WO | 2007143232 | 12/2007 |
| WO | 2012082929 | 6/2012 |

OTHER PUBLICATIONS

Bernstein, Michael S. et al., "Enhancing Directed Content Sharing on the Web," Proceedings of the 28th International Conference on Human Factors in Computing Systems, Atlanta, GA, Apr. 10-15, 2010, pp. 971-980.

Carvalho, Vitor R. et al., "Ranking Users for Intelligent Message Addressing," Proceedings of the 30th European Conference on Information Retrieval, Glasgow, England, Mar. 30-Apr. 3, 2008, pp. 321-333.

Culotta, Aron et al., "Extracting Social Networks and Contact Information from Email and the Web," Proceedings of the First Conference on Email and Anti-Spam (CEAS), Mountain View, CA, Jul. 30-31, 2004 (document provided includes third-party comments submitted under the USPTO PeerToPatent program).

Elsayed, Tamer et al., "Personal Name Resolution in Email: A Heuristic Approach," University of Maryland Technical Report No. TR-LAMP-150, Mar. 17, 2008.

Fitzpatrick, Brad, "AddressBooker," Github Social Coding, located at http://addressbooker.appspot.com/, Nov. 28, 2008 (document provided includes third-party comments submitted under the USPTO PeerToPatent program).

Google Inc. "OpenSocial Tutorial," located at http://code.google.com/apis/opensocial/articles/tutorial/tutorial-0.8.html, Aug. 2008.

Google Inc., "Automatic Updating of Contacts," Gmail help forum, located at http://74.125.4.16/support/forum/p/gmail/thread?tid=03f7b692150d9242&hl=en, Apr. 27, 2009 (document provided includes third-party comments submitted under the USPTO PeerToPatent program).

Hillebrand, Tim, "Plaxo: The Smart Auto Update Address Book," Smart Phone Mag, located at http://www.smartphonemag.com/cms/blogs/9/plaxo_the_smart_auto_update_address_book, Nov. 6, 2006 (document provided includes third-party comments submitted under the USPTO PeerToPatent program).

International Patent Application PCT/US10/34782, International Search Report, Dec. 22, 2010.

International Patent Application PCT/US10/34782, Written Opinion, Dec. 22, 2010.

International Patent Application PCT/US10/35405, International Search Report and Written Opinion, Jan. 3, 2011.

Microsoft Corporation, "About AutoComplete Name Suggesting," Microsoft Outlook 2003 help forum, located at http://office.microsoft.com/en-us/outlook/HP063766471033.aspx, 2003.

OpenSocial Foundation, "Social Application Tutorial (v0.9)," located at http://wiki.opensocial.org/index.php?title=Social_Application_Tutorial, accessed Oct. 8, 2010.

PCWorld Communications, Inc., "Your Contacts Are Forever: Self-Updating Address Book," located at http://www.pcworld.com/article/48192/your_contacts_are_forever_selfupdating_address_book.html, May 1, 2001 (document provided includes third-party comments submitted under the USPTO PeerToPatent program).

International Patent Application PCT/US10/52081, International Search Report and Written Opinion, May 20, 2011.

International Patent Application PCT/US11/64958, International Search Report and Written Opinion, Jul. 31, 2012.

International Patent Application PCT/US12/043523, International Search Report and Written Opinion, Nov. 28, 2012.

(56) References Cited

OTHER PUBLICATIONS

International Patent Application PCT/US2011/064892, International Search Report and Written Opinion, Aug. 22, 2012.
International Patent Application PCT/US2012/043507, International Search Report and Written Opinion, Jan. 3, 2013.
U.S. Appl. No. 61/407,018, filed Oct. 27, 2010.
European Patent Application No. 11849271.9, Extended Search Report, Apr. 3, 2014.
Extended European Search Report, EP 10 78 3783, dated Mar. 24, 2014.
European Patent Application No. 12801970.0, Extended Search Report, Oct. 23, 2014.

* cited by examiner

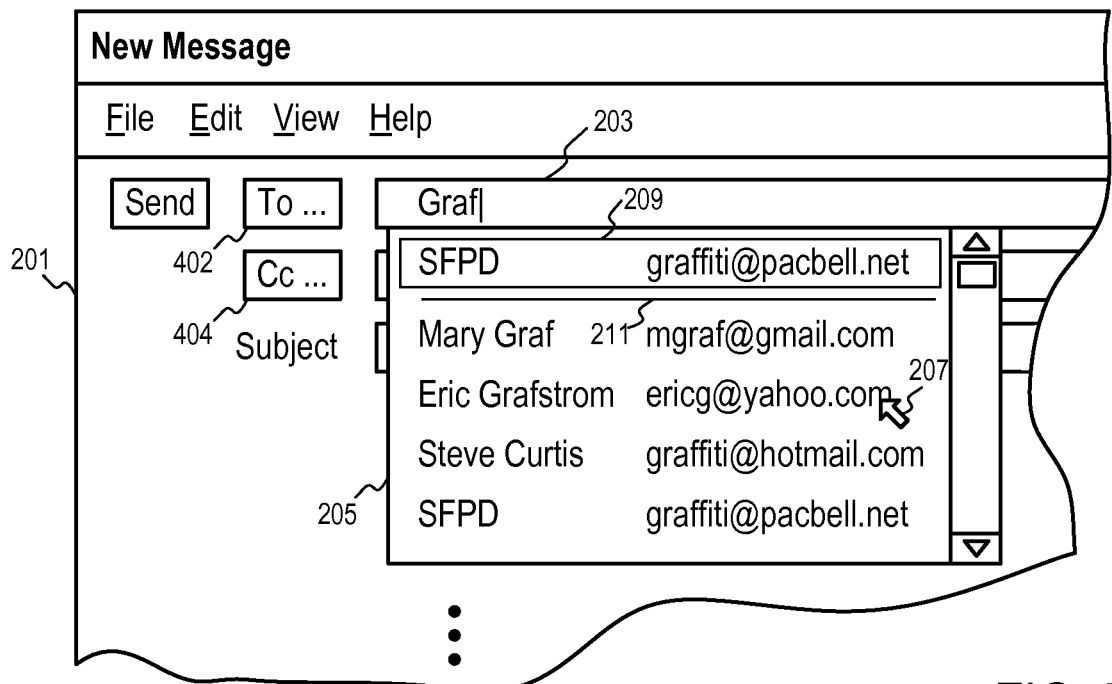
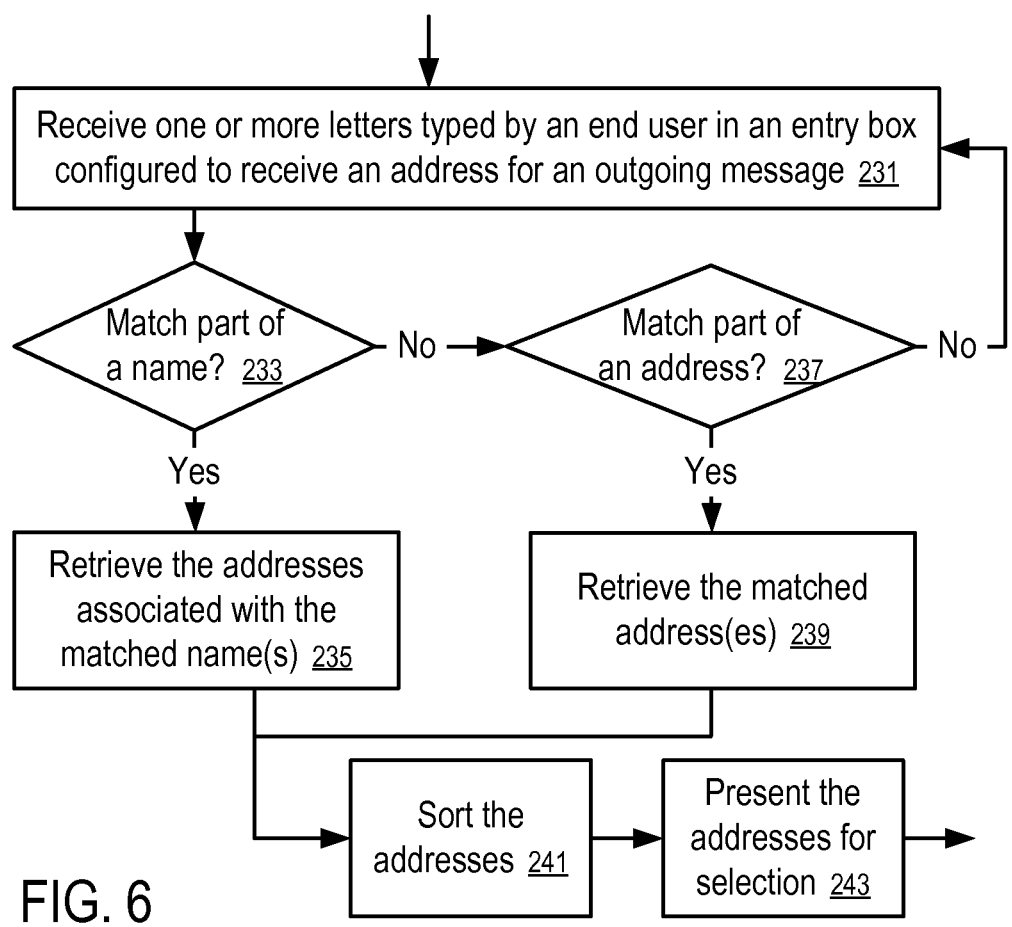
FIG. 5
FIG. 6

DEFINING A SOCIAL NETWORK MODEL IMPLIED BY COMMUNICATIONS DATA

CROSS-REFERENCE TO RELATED APPLICATIONS

The present application claims priority to U.S. Provisional Application Ser. No. 61/392,441, filed Oct. 12, 2010, entitled "DEFINING A SOCIAL NETWORK MODEL IMPLIED BY COMMUNICATIONS DATA," by Hein et al., the entire contents of which are incorporated by reference as if fully set forth herein.

This application is related to U.S. Non-Provisional application Ser. No. 12/499,775, filed Jul. 8, 2009, entitled "SYSTEMS AND METHODS TO PROVIDE ASSISTANCE DURING ADDRESS INPUT," by Thatcher et al., the entire contents of which are incorporated by reference as if fully set forth herein.

FIELD OF THE TECHNOLOGY

At least some embodiments of the disclosure relate to social networks in general and, more particularly but not limited to, defining a social network model for a user using data implied by communications (e.g., emails or instant messages) to or from the user.

BACKGROUND

A social network service is an online service, platform, or site that focuses on building social networks among people (e.g., who share interests and/or activities). A social network service typically consists of a representation of each user, his/her social links, and various other additional services. Most social network services are web based and provide means for users to interact over the Internet. Social networking sites allow users to share ideas, activities, events, and interests within their individual networks.

The main types of social networking services are those which contain category places (such as former school-year or classmates), means to connect with friends (usually with self-description pages) and a recommendation system linked to trust. Popular methods now combine many of these, with the Facebook, Bebo and Twitter services widely used worldwide. The MySpace and LinkedIn services are also widely used in North America.

Traditionally, when joining a social network, a person has to build out his or her social network manually by adding friends. Often this requires that numerous requests be sent to and accepted by other persons that one desires to add as friends to his or her network. Additionally, conventional OpenSocial containers (e.g., iGoogle) require the user to explicitly declare those persons that are part of a group of "friends" and those persons that are merely part of the group "all."

SUMMARY OF THE DESCRIPTION

Systems and methods are provided to define a social network for a user using data implied by email communications to or from the user. Some embodiments are summarized in this section.

In one embodiment, a computer implemented method includes: scanning, by a data processing system, a set of messages of a user to identify a plurality of primary persons addressed in the messages as a primary recipient and to identify a plurality of secondary persons addressed in the messages as a secondary recipient; mapping, by the data processing system, the primary persons to a plurality of friends and mapping the secondary persons to a plurality of other persons or contacts; and defining, by the data processing system, a social network model based on the friends and other persons, wherein the model comprises a friends category including the friends and an all category including the friends and other persons.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIG. 5 illustrates another user interface to provide assistance in address input according to one embodiment.

FIG. 6 shows a method to select suggestions to complete address input according to one embodiment.

DETAILED DESCRIPTION

Figure 1:
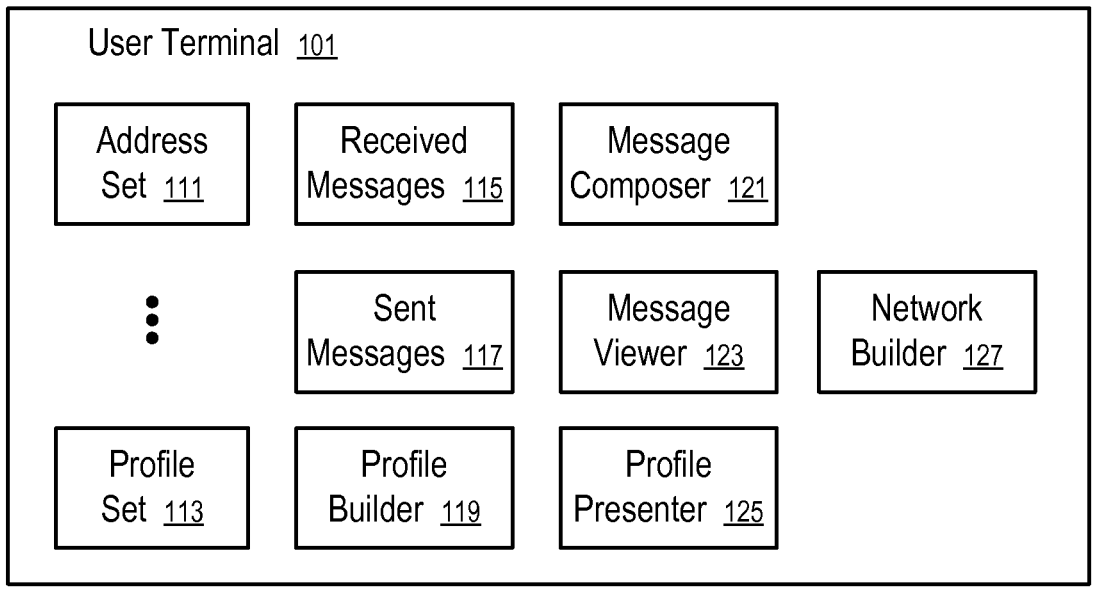
FIG. 1 shows a user terminal to provide assistance in address input according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, a method comprises scanning a set of messages (e.g., emails to and from a user of a client device) to identify a plurality of primary persons addressed in the messages as a primary recipient and to identify a plurality of secondary persons addressed in the messages as a secondary recipient; mapping the primary persons to a plurality of friends and mapping the secondary persons to a plurality of other persons or contacts; and defining a social network model based on the friends and other persons, wherein the model comprises a friends category including the friends and an all category including the friends and other persons.

In one embodiment, each primary recipient is listed in a To field of an email, and each secondary recipient is listed in a Cc or Bcc field of an email. In one embodiment, the method further comprises scanning the set of messages to build person profiles (e.g., see discussion regarding FIG. 2 below) for each of the primary persons and each of the secondary persons.

In one embodiment, the method further comprises exposing data from the person profiles for the primary persons in response to a request from a gadget (e.g., a social gadget running on the user terminal). In one embodiment, the method further comprises storing the social network model on the user terminal (the gadget is running on the user terminal at the time of the request). In one embodiment, the method of further comprises storing the social network model on the user terminal, wherein the gadget is running on a device other than the user terminal at the time of the request (e.g., a remote server).

In one embodiment, the set of messages corresponds to a user, and the mapping of the primary persons is performed without manual input from the user regarding each of the friends. This is in contrast to prior approaches that require the user to manually indicate friends and/or for other users to accept a friend request. In one embodiment, the defined social network model is stored on the user terminal. In one embodiment, the set of messages is stored on the user terminal (e.g., stored as a local email corpus) during the scanning.

In one embodiment, the social network model is implemented with a set of common application programming interfaces (APIs) for a web-based social network application (e.g., implemented on an OpenSocial container). In one embodiment, the set of APIs is hosted on the user terminal (e.g., the OpenSocial container is implemented on the user terminal). In one embodiment, the method further comprises computing scores (as discussed below) of the primary persons to determine relevancy to the user, and selecting persons for the friends category of the social network model based on the scores.

Some of the embodiments described in more detail below use gadgets and may be implemented using the OpenSocial specification. A gadget refers to a computer program that provides services without needing an independent application to be launched. Gadgets typically run in an environment that manages multiple gadgets. There are several implementations based on existing software development techniques, such as JavaScript.

Some gadgets work with social networks. A social gadget uses an XML file and may be implemented, for example, using Google gadgets and Google's iGoogle service with the OpenSocial application programming interface (API). Gadgets that work with the OpenSocial API are known as OpenSocial gadgets.

OpenSocial is a set of APIs for building social applications that run on the web (see, e.g., the OpenSocial Specification 1.0, which is incorporated herein by reference in its entirety). OpenSocial's goal is to make more apps available to more users, by providing a common API that can be used in many different contexts. Developers can create applications, using standard JavaScript and HTML, that run on social websites that have implemented the OpenSocial APIs. These websites, known as OpenSocial containers, allow developers to access their social information; in return they receive a large suite of applications for their users.

The OpenSocial APIs expose methods for accessing information about people, their friends, and their data, within the context of a container. This means that when running an application, for example, on Orkut, a person is interacting with his or her Orkut friends, while when running the same application on MySpace, the person can interact with his or her MySpace friends.

More specifically, OpenSocial is a set of common application programming interfaces (APIs) for web-based social network applications, developed by Google along with MySpace and a number of other social networks. Applications implementing the OpenSocial APIs will be interoperable with any social network system that supports them, including features on sites such as Hi5.com, MySpace, Friendster, and Yahoo!.

Based on HTML and JavaScript, as well as the Google Gadgets framework, OpenSocial includes a set of APIs for social software applications to access data and core functions on participating social networks. Each API addresses a different aspect. As examples, one is the general JavaScript API, one is for people and friends (people and relationship information), one is for activities (publishing and accessing user activity information), and one is for persistence (simple key-value pair data for server-free stateful applications).

Each OpenSocial gadget consists of two XML files: an Application Manifest and a Gadget Manifest. The Application Manifest primarily describes the gadget (Title, Description, Author). The Gadget Manifest contains the HTML/CSS/Javascript for the gadget. This is information about the features the gadget needs (e.g., access to friends, certain user interface libraries, etc.), and language information (English, German, etc.). These features are described in the OpenSocial documentation and typically work the same across OpenSocial containers.

Figure 9:
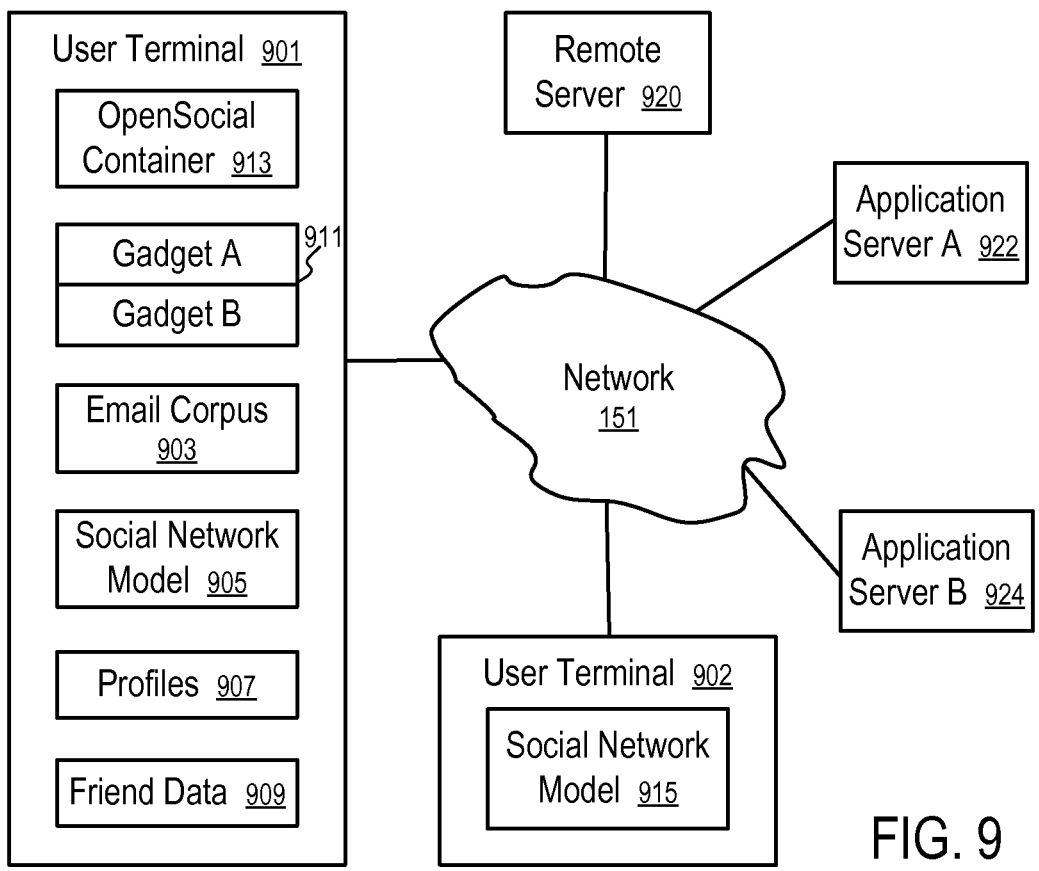
FIG. 9 shows a user terminal including a social network model defined based on scanning of an email corpus.

FIG. 9 shows a user terminal (901) including a social network model (905) determined based on the scanning of an email corpus (903) (e.g., a collection of sent and received emails stored on user terminal (901)). The user terminal (901) may communicate with various servers in an automated way over the network (151) (e.g., to extract data for profile (131) as discussed below or to obtain data requested by one of gadgets (911) running on user terminal (901)). Network (151) is discussed in more detail below. These various servers may include remote server (920), and application servers (922, 924). User terminal (901) may also communicate with user terminal (902) (of a different user, such as a friend). In one embodiment, this communication may be implemented with peer-to-peer networking.

In one embodiment, user terminal (902) has a social network model (915) determined using a method similar to or the same as that for user terminal (901). Typically, social network model (915) will be different from model (905) for user terminal (901) because the email corpus will be different.

Figure 2:
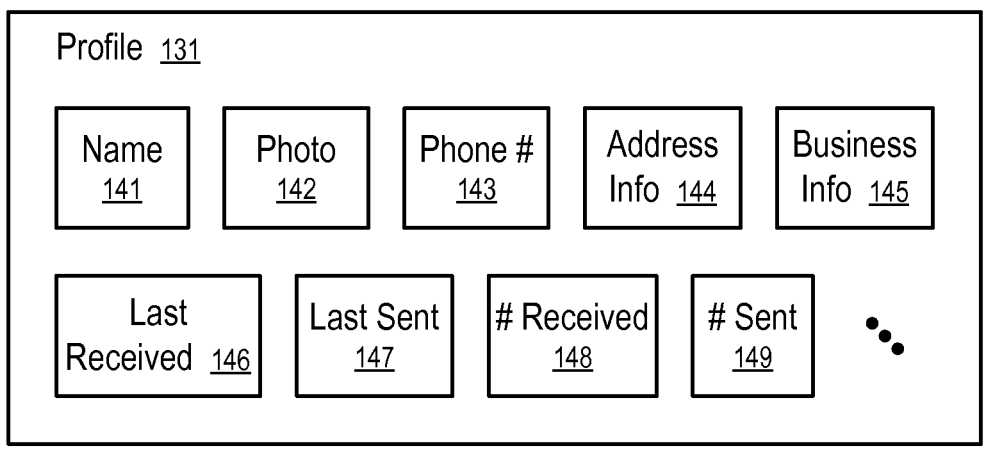
FIG. 2 illustrates a profile of a person according to one embodiment.

User terminal (901) may further include a user control interface that permits the user to selectively implement or use various gadgets (911) on user terminal (901). For example, the user may disable certain gadgets. In one embodiment, gadgets (911) have access to social data on user terminal (901), including social network model (905). Gadgets (911) may, for example, have access to social data for friends of the user as defined by model (905). Personal data (e.g., contact information, photos) of such friends that is stored on user terminal (901) as friend data (909) (e.g., data stored as profiles (907)) may be provided in response to requests from gadgets (911), or to gadgets running on remote server (920) or devices other than user terminal (901). Person profiles as may be used in profiles (907) are discussed in detail below and are illustrated in FIG. 2.

In one embodiment, user terminal (901) hosts a social website as an OpenSocial container (913), in conformity with the OpenSocial specifications. OpenSocial container (913) permits software applications running, for example, on user terminal (901), user terminal (902), or on Application Server A or B to access social data in social network model (905). The user of user terminal (901) may be provided a user interface to permit control of such access based on various factors (e.g., social relationship).

In one embodiment, OpenSocial container (913) exposes a user's friend data, and further exposes the user's data as well (e.g, the user's name, phone number, email address, etc.). In some cases, actual email data of the user may be exposed. In one embodiment, gadgets (911) include an Amazon gadget and a Sports gadget.

The Amazon gadget scans the currently-selected email (i.e., selected by the user in an email application viewing interface) for Amazon URLs. If the gadget finds a match, the gadget shows a picture of the product and its star rating to the user (e.g., in a window of the email application). For friend identification (i.e., the building of a friends list in social network model (905)) server interaction by user terminal (901) is not necessary (e.g., when using a locally-stored email corpus (903)), but gadgets (911) may interact with servers (e.g., application servers (922, 924)). For example, the Amazon gadget parses the URL, makes a request to Amazon's server for information about that URL, and then shows the information to the user.

For the Sports gadget, if the user selects a person with a phone number, the Sports gadget will look at the selected person's area code, and show the current user sports scores related to the currently selected person's area code. This could be used by, for example, a salesperson who wants to engage a potential client in a relevant conversation.

Figure 10:
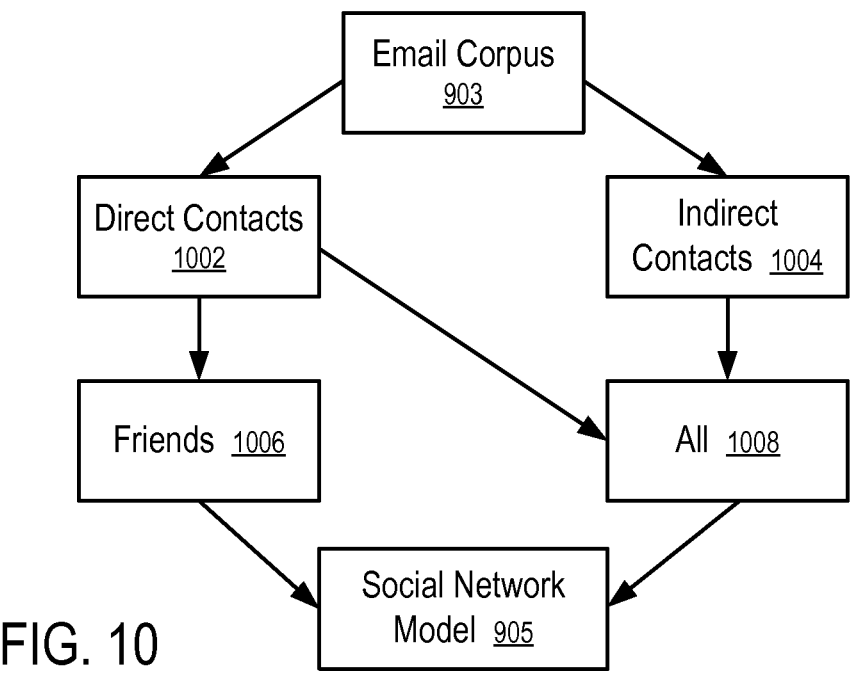
FIG. 10 shows the scanning and mapping of an email corpus to define a social network model.

FIG. 10 shows the scanning and mapping of email corpus (903) to define social network model (905). Email corpus (903) may be, for example, an aggregation of email communications to and from user terminal (901) (an example of such emails is described in more detail below with respect to received messages (115) and sent messages (117) for user terminal (101), which messages may form email corpus (903)). Other aggregations of messages may be used (e.g., instant messages or other communications from which data can be derived).

In one embodiment, email corpus (903) is scanned to identify direct contacts and indirect contacts. Direct contacts (1002) are messages in which the contact (i.e., person) is listed in the To field of the message where the message is sent by the user to another person, or where the user receives the message. Indirect contacts (1004) include all other messages on which the user has been copied (e.g., by Cc or Bcc).

Next, direct contacts (1002) are mapped into a list of friends (1006), and direct contacts (1002) and indirect contacts (1004) together are mapped into a list of "all" contacts (1008) (i.e., all contacts of the user, including friends). These lists of friends and all contacts define social network model (905), which may be used as a basis via which access to certain friend data stored on user terminal (901) is provided in response to process requests (e.g., requests by a gadget such as gadgets (911)). In alternative embodiments, other mappings of message communication information may be used to define alternative social network models.

A network builder running on user terminal (901) may be used to perform the scanning and mapping above to provide social network model (905). An example is network builder (127) described with respect to FIG. 1 below.

In one embodiment, profiles (907) (e.g., created using profile builder (119) discussed below) and/or ranks of persons (determined using relevancy scores computed as discussed below) are used to build and/or rank a set of profiles for persons in the emails of the user of user terminal (901). A process running on user terminal (901) (e.g., network builder (127)) automatically selects some of the persons in the profiles (907). In response to a request for friends from an OpenSocial gadget, the process queries for the direct contacts (1002). The computed relevancy scores that rank the persons may be used in the selection of the friends. The social network is an aggregation of these "friend" relationships, and may include other relationships inferred from the email communications.

In another embodiment, user terminal (901) scans through the user's email corpus as described herein, and, among other tasks, sets up user profiles and the user's localized social network based on that corpus. This social network is centered around senders and recipients; basically, anyone with an email address in one of the emails. In alternative embodiments, this process is not limited to email, but may be applied to any sort of document. The social network is constructed by parsing entities from the contents of the document and not necessarily senders or receivers. Regardless of the manner in which the social network is built, a layer is put on top of the social network. The use of the OpenSocial specification allows third party applications to have controlled access to a user's data (e.g., on user terminal (901)) and the user's friends' data (e.g. on user terminal (901)) in a relevant context in order to provide some sort of useful utility (e.g., implemented as a gadget).

In one embodiment, the strength of the relationships of the user with the other persons is based on the content of the messages or documents sent to or received by the user (the importance of people relevant to a user may be ranked as described herein). OpenSocial provides the ability to access a user's contacts or the user's friends, which are a special subset of contacts. As described herein, persons may be categorized into a "friends" group or not, which is suitable for an OpenSocial implementation. Network builder (127) maps direct contacts (1002) (i.e., an email directly to or from a user, but not where the user is Cc'd) to OpenSocial's concept of friends, and everyone else to OpenSocial contacts (the aggregation of friends and everyone else corresponds to a category of "all" persons or contacts).

In one embodiment, user terminal (901) scans a local email corpus (903) and builds contacts for each person it encounters. Terminal (901) creates connections between the persons as they are seen together on the various emails (e.g., if a person A emails person B, these persons are connected). Terminal (901) is then able to use these connections to determine a given person's social network (i.e., the network for a user is a list of all the persons the user has emailed or been emailed by).

The OpenSocial specification defines two groups of people: "friends" and "all." The "all" group for a given user is all of the people in that user's network (i.e., all of the direct and indirect contacts). The friends group for a given user is a subset of his or her network including only those people that the user has emailed directly or been emailed by (i.e., if person A and person B are only connected because they were Cc'd on the same email, person A and person B are not considered friends).

Typical OpenSocial containers (e.g., iGoogle) require the user to explicitly declare persons who are part of the group "friends" and persons who fall in the group "all." In this embodiment, user terminal (901) does this automatically, removing the need for the user to invest a significant amount of time setting up his or her network before the user can begin using it. This social network model functionality may be built on top of the profile building processes described in greater detail below with respect to user terminal (101) and profiles (131). In alternative embodiments, the social network modeling approach described herein could be used in a comprehensive social networking service in which users are able to interact in a more traditional social context without having to first manually build out a list of connections.

In one embodiment, direct contacts (1002) are emails that are mailed directly to a person using the To field or that are received from a person using the To field. Indirect contacts (1004) are emails that the user is Cc'd on or that the user sends to somebody and copies (e.g., Cc's) them. Social networks have a notion of first-level friends and second and other-level friends. The process of this embodiment takes the information that is in an email corpus and maps it onto various of those levels. This process infers the user's social network from the data by mapping the data onto these traditional social network concepts.

In this embodiment, the social network is built using the local email corpus as follows: email communications are regularly indexed (e.g., each time a new email is received, each time the user manually initiates it, and/or at predetermined periodic intervals). Relevant information such as names, times, dates, addresses, attachments, etc. is extracted from the emails. From this extracted data, a list of contacts is built (including a record of who is Cc'd on an email, who an mail is sent to, who an email is received from). All of this information is gathered as the indexing process is performed.

Once the above indexing is complete, the contacts may be searched more quickly than the raw email corpus data. The contacts are then ranked based on relevancy to the user as described herein. At this point, user terminal (901) has an indication of the user's network (e.g., how people are connected, who the user's direct contacts are, and who the user's indirect contacts are).

In the above embodiment, open social gadgets are used on user terminal (901) (such as gadgets (911)). OpenSocial APIs are opened so that the user's network of friends is exposed to applications that run on user terminal (901). For example, an application may obtain a list of the user's top ten friends and expose information about these friends such as exposing their emails, phone numbers or other data obtained during the email extraction process above.

In the above embodiment, the friend's information is stored locally on user terminal (901). After the social network model (905) is automatically created, user terminal (901) is able to expose information from social network model (905) to third party application developers that prepare gadgets to run on user terminal (901). More specifically, these third party developers make gadgets that may be used on user terminal (901) (e.g., downloaded by the user from application server (922) onto user terminal (901)). There may be gadgets on user terminal (901) for the Facebook, Linked In, and Twitter services, and these gadgets may access the friend and other data stored in profiles (907).

In the above embodiment, the Twitter gadget is now used as an example with a hypothetical Person A and Person B. The Twitter gadget on user terminal (901) has access to data about Person B (e.g., email and phone number, etc.). The Twitter gadget may expose the list of friends for Person A, and then the Twitter gadget can determine all of the Twitter accounts for those friends (e.g., by accessing an application server of Twitter).

Specific embodiments of various data processing systems that may be used to implement the above social network building are now described below. These systems generally permit communications among a number of users.

Many systems and applications have been developed to allow people to communicate with each other. Such systems and applications may provide communication via emails, instant messages, text messages, web/online postings, etc. Email systems typically use servers to receive the electronic messages from the senders, to store and/or forward the messages on behalf of the senders, and to deliver the messages to the recipients. Since the servers can store the messages for a period of time before delivery, a recipient and a sender do not have to establish a direct communication connection to facilitate the transmission of the electronic message. Thus, the sender and the recipient do not have to be online simultaneously for email communications.

In an email system, an email client application is typically used to receive and display messages and to compose and send messages. The email client application communicates with one or more email servers to receive and send messages. Email addresses are used to identify the recipients of the messages.

An email client application may be a stand-alone application running on a user terminal (e.g., a personal desktop or portable computer, a personal digital assistant (PDA), or a smart phone). The email client application stores messages received from one or more email servers, and can display the stored messages to a user even when the user terminal is not connected to the network.

An email client application may also be implemented in part via a server. The server stores the messages on behalf of a user, and when requested, formats a message as a web page for display on a browser used by the user.

Instant messaging (IM) allows real-time communication between people. A communication connection between the devices of the participants in an instant messaging session is required for the delivery of the instant messages sent during the session. User names are typically used to identify the online presence and thus the online addresses (e.g., Internet Protocol (IP) addresses) of the users, which are used to establish the communication connections for the instant messaging session. Therefore, the user names of instant messaging systems can be considered as the addresses for establishing online connections for instant messaging sessions, from the point of view of the users.

Text messaging allows users to communicate via mobile phones over a cellular communications network. Text messages are typically transmitted via Short Message Service (SMS) or Multimedia Messaging Service (MMS). The phone numbers of the mobile phones are used as the addresses of the recipients of the text messages.

Some user terminals (e.g., personal computers, PDA, mobile phones) may support communications in multiple modes, such as email, instant messages, and text messages. Some applications have been developed to organize address information for users. For example, an address application may store information about a plurality of persons. For each of the persons, the address application may store the name of the person, the email address of the person, the street address of the person, the IM address of the person, the web page address of the person, phone numbers of the person, etc.

FIG. 1 shows a user terminal (101) to provide assistance in address input according to one embodiment. It should be noted that user terminal (101) or (901) may be implemented as a personal computer, a web enabled television set, a personal digital assistant (PDA), or a mobile phone, using special purpose hardware (Application-Specific Integrated Circuit (ASIC) or Field-Programmable Gate Array (FPGA)), software and a general purpose processor, or a combination of special purpose hardware and software. Thus, the disclosure is not limited to a particular implementation. In one embodiment, in addition to the functions described below, user terminal (101) implements the social network scanning and mapping functions of user terminal (901) discussed above.

In FIG. 1, the user terminal (101) is configured to store the messages (115) received at the user terminal (101) and the messages (117) sent from the user terminal (101). Each message (115) may be an email, and typically has a To field and may include a Cc and/or Bcc field. The user terminal (101) includes a message viewer (123) which can be used to display a message selected from the received messages (115) or selected from the sent messages (117).

In FIG. 1, the user terminal (101) further includes a network builder (127) which is configured to scan the set of messages (e.g., emails) of a user of the user terminal (101) to identify a plurality of primary persons addressed in the messages as a primary recipient (e.g., by a To field) and to identify a plurality of secondary persons addressed in the messages as a secondary recipient (e.g., by a Cc field), and to map the primary persons to a plurality of friends and map the secondary persons to a plurality of other contacts. This mapping is used to define a social network model as described herein.

In FIG. 1, the user terminal (101) further includes a message composer (121) which is configured to present a user interface to facilitate the composition of an outgoing message.

In one embodiment, the user terminal (101) is configured to generate an address set (111) based on the addresses that have been specified in the message composer (121) for one or more previously sent messages (117). When an address is used in the message composer (121) to specify a recipient of a message, the address is added to the address set (111), if the address is not already in the address set (111).

In one embodiment, the message composer (121) uses the address set (111) to suggest candidates for the completion of an input when the user is typing an address. For example, when the characters typed in an address field are the same as the first characters in a number of email addresses in the address set (111), the message composer (121) displays the email addresses as possible candidates for the completion of the input.

In one embodiment, the user terminal (101) further includes a profile presenter (125), which can provide suggestions for completion based on the profile set (113) maintained by the profile builder (119).

In one embodiment, the profile builder (119) is configured to extract profile data of various persons based on the received messages (115) and the sent messages (117). The profile builder (119) can extract information about persons not only from the headers of the messages where the senders and the recipients of the messages are specified, but also from the bodies of the messages and from other online sources, such as online directories, social networking websites, web pages, result pages found by search engines, etc.

Since the profile builder (119) obtains the profile data for various persons referenced in the messages (115 and 117), the profile set (113) is more comprehensive than the address set (111).

In one embodiment, the profile builder (119) is configured to scan the received messages (115) and the sent messages (117) for email addresses and names associated with the email addresses. The profile builder (119) generates a profile for each person identified to create the profile set (113). When new messages are received or sent, the profile set (113) is updated based on the new messages.

In some embodiments, the profile builder (119) may further identify persons based on scanning the received messages (115) and the sent messages (117) for phone numbers, names, addresses, etc.

In some embodiments, some or all of the components (111-125) in the user terminal (101) may be hosted on a server remote to the user terminal (101) (e.g., accessible via a website and a web browser). For example, in one embodiment, the received messages (115) and the sent messages (117) may be hosted on a web site; and the user can use a web browser to view a selected one of the messages (115 and 117).

For example, the profile builder (119) may be configured to communicate with the server to extract the profile set (113) from the messages (115 and 117) hosted on the server. Alternatively, the profiler builder (119) may also be hosted on the server to build the profile set (113) on the server.

FIG. 2 illustrates a profile of a person according to one embodiment. In FIG. 2, the profile (131) includes various fields, such as the name (141) of the person, a photo image (142) of the person, one or more phone numbers of the person (143), address information (144) (e.g., email address, IM address, street address), business information (145) (e.g., employer, work address, job title), the date and time of the last message received from the person (146), the date and time of the last message sent to the person (147), the total number of messages received from the person (148), the total number of messages sent to the person (149), etc.

In one embodiment, the profile builder (119) obtains at least some of the information for the fields from the received messages (115) or the sent messages (117) to identify the person, and then uses other information sources to obtain the data for the other fields in an automated way to collect the profile information on behalf of the user.

For example, the profile builder (119) may use social networks, search engines, photo services, etc. to obtain the photo (142), the business information (145), etc.

Figure 3:
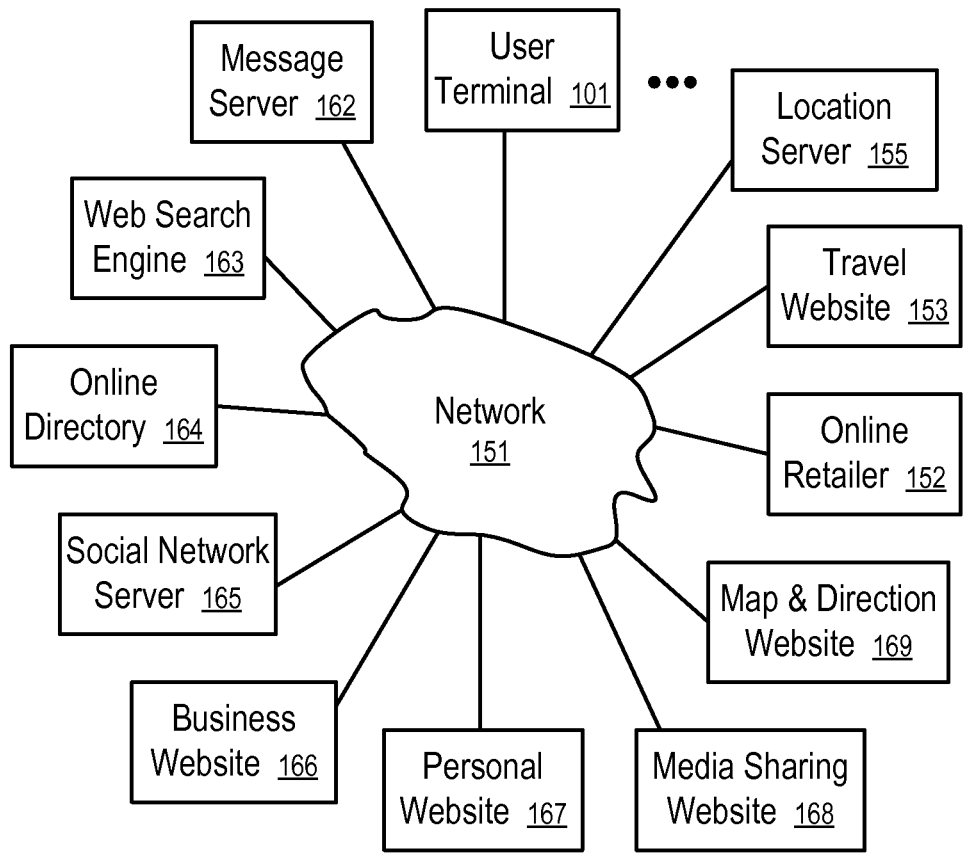
FIG. 3 illustrates a system to obtain data for a profile according to one embodiment.

FIG. 3 illustrates a system to obtain data for a profile according to one embodiment. In FIG. 3, under the control of the profile builder (119), the user terminal (101) may communicate with various servers in an automated way to extract data for the profile (131) over the network (151). The network (151) may include a local area network, a cellular telecommunications network, a wireless wide area network, a wireless local area network, a wireless personal area network, an intranet, and/or Internet.

In one embodiment, the user terminal (101) communicates with the message server (162) to receive and send the messages (115 and 117).

In one embodiment, after the profile builder (119) extracts from the messages (115 or 117) certain information (e.g., an email address, an IM user name, a phone number, and/or a name) about a person, the profile builder (119) uses the extracted information to query various servers to obtain further information (e.g., photo (142), phone number (143), address information (144), and/or business information (145)) about the person to create the profile (131).

For example, the user terminal (101) may query a web search engine (163), an online directory (164), a social network server (165), a business website (166), a personal website (167), a media sharing website (168), a map and direction web site (169), an online retailer (152), a travel website (153), a location website (155), and/or other servers. Information that can be used as search criteria include names, screen names, social network profile names, social network profile URLs, physical addresses, website URLs, email addresses, or telephone numbers. Information that is collected as a result of these queries may be used in future searches to identify additional information that may be used to create a person profile.

For example, the user terminal (101) may receive an email sent by a person via the message server (162). The profile builder (119) of the user terminal (101) is configured to perform a search using the web search engine (163) with the email address of the person as the search criteria. The search engine (163) may return a search result that includes the phone number (143) of the person. The profile builder (119) extracts the phone number (143) from the search result and stores the phone number (143) as part of the profile (131) of the person. The search engine (163) may also return the URL for or link to a personal website (167) belonging to the person. The personal website (167) may contain additional information about the person that may be used to create a person profile, such as additional contact information or biographical information.

In another example, the email address belonging to the person may include an extension (or domain name) for a company. The profile builder (119) of the user terminal (101) is configured to perform a search using the search engine (163) with the email extension (or domain name) as the search criteria. A result returned by the search may be a business website (166). The profile builder (119) of the user terminal (101) is further configured to search the business website (166) to obtain information relevant to the profile (131) of the person. For example, a web page on the business website (166) may contain additional information about the person that may be used to create a person profile, such as business information (145), additional contact information or biographical information.

In another example, the profile builder (119) of the user terminal (101) is configured to perform a search using an online directory (164) (e.g., a person search directory, a yellow page directory) with the name (141) of the person or other contact information as the search criteria. The online directory (164) may return search results that include additional contact information and other information that may be used for the profile (131) of the person.

In another example, the user terminal (101) may receive an email sent by the person via the message server (162). The email may contain a social network user name for the person. The profile builder (119) of the user terminal (101) is configured to extract this social network user name from the email and use it to access the social network server (165). A webpage on the social network server (165) may contain additional contact information and other information that may be extracted and used by the profile builder (119) to create the profile (131) of the person. The webpage on the social network server (165) may also contain additional contacts that may be associated with the person in the profile (131). For example, persons on the friends list of the webpage on the social network server (165), or persons who have posted comments or messages on the social network server (165) may be listed as contacts in a contact network for the person.

In another example, a search performed using the search engine (163) may return a URL or link for a media sharing website (168) (e.g., for sharing photos or videos). The media sharing website (168) may store profile information about the person. Thus, the profile builder (119) of the user terminal (101) can extract additional contact information or biographical information from the media sharing website (168) for the creation of the profile (131) of the person. For example, a profile belonging to the person on a video sharing website may include an instant message screen name (user name) for the person. This screen name may be extracted and displayed as part of the profile (131) of the person.

In one embodiment, information extracted from communications between the person and other users may also be used to update profile information on a social network server (165) or other websites. For example, the profile builder (119) of the user terminal (101) may detect that the person has primarily used email address "david@foo.com" in recent communications, whereas the profile of the person on the social network server (165) shows his email address as "david@bar.com." The profile builder (119) of the user terminal (101) can share the new email address of the person with the social network server (165) to allow the social network server (165) to automatically update the corresponding information about the person, or to suggest the person to make an update based on this changed behavior detected by the profile builder (119) of the user terminal (101).

In one embodiment, the profile builder (119) of the user terminal (101) can also extract information about the person from the travel website (153) and the online retailer (152) for the creation of the profile (131) of the person. For example, after an email containing information about a flight itinerary is received in the user terminal (101), the profile builder (119) of the user terminal (101) may extract a flight number or other information about a flight from the email. The profile builder (119) of user terminal (101) then queries the travel website (153) using the flight number or other flight information as search criteria. Information about the flight, such as the destination city or the departure city, expected departure time, expected arrival time, expected delays, weather in the destination city, weather in the departure city, or any changes to the flight may be used as part of the profile (131) of the person.

In another example, an email containing information about an item or service that the second user is interested in purchasing may be received in the user terminal (101). The profile builder (119) of user terminal (101) is configured to query one or more search engines, websites, or on-line retailers (152) to determine which retailer or website has the best price or currently has the item in stock or the service available. This information is extracted by the profile builder (119) and displayed by the profile presenter (125) as part of the profile (131) of the person.

In one embodiment, the profile builder (119) of the user terminal (101) can also extract information from a map and direction website (169) and location servers (155) as part of the profile (131) of the person. For example, the person may own a GPS unit, cell phone, or other device that is capable of transmitting the person's current physical location to the location server (155), which allows other users to access the person's current location information. If the user of the user terminal (101) has permission to view the location information of the person, the profile builder (119) of the user terminal (101) may access the location server (155) over the network (151) to receive location information about the person. This location information can be displayed as part of a person profile.

The profile builder (119) of the user terminal (101) may also access the map and direction website (169) to create a map of the current location of the person, or to generate directions to the current location of the person. The map or directions may be displayed by the profile presenter (125) as part of the profile (131) of the person. The map and direction website (169) may also be used to generate a map or directions to one or more known street addresses of the person, such as a work address or home address. The map or directions can be displayed by the profile presenter (125) as part of the profile (131) of the person.

Figure 4:
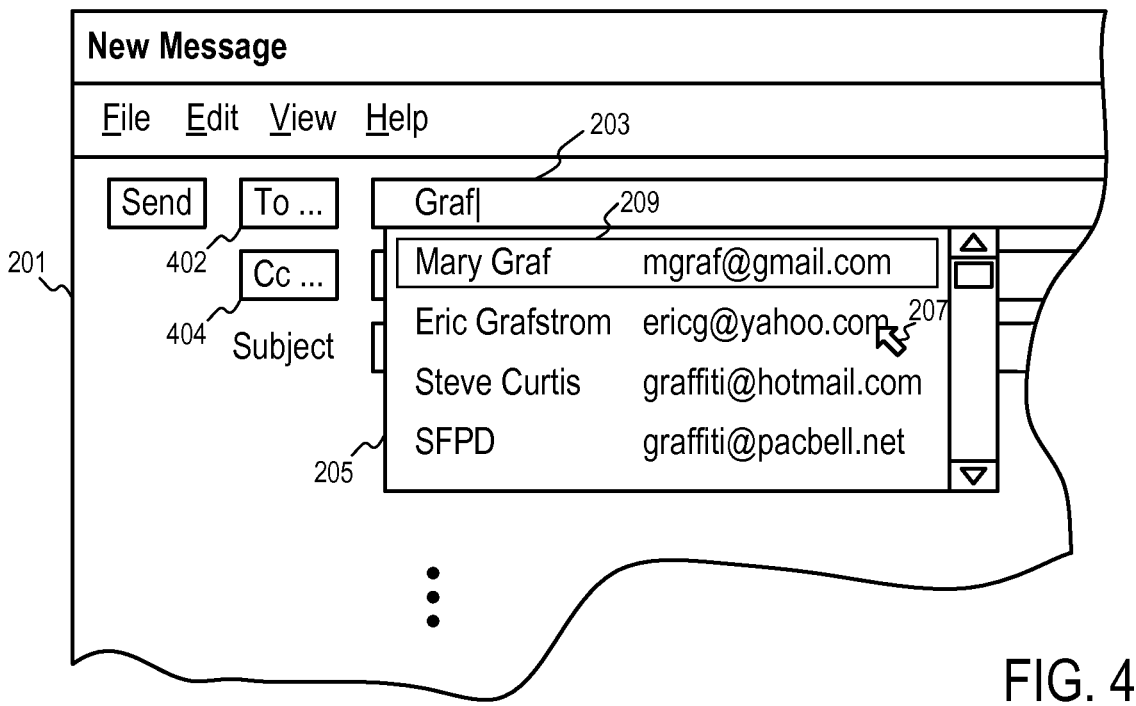
FIG. 4 illustrates a user interface to provide assistance in address input according to one embodiment.

FIG. 4 illustrates a user interface to provide assistance in address input according to one embodiment. In FIG. 4, the user interface (201) is configured for composing an outgoing message. The user interface (201) includes entries to specify the addresses of the recipients of the message. For example, the entry box (203) is configured to receive the email address of an outgoing email, which may be sent from the user terminal (101) via the message server (162). Recipients may be specified in a To field (402) and/or in a Cc field (404) (or a Bcc field, not shown).

In one embodiment, when the entry box (203) detects a change in the content received in the entry box (203) (e.g., a keystroke is received in the entry box (203), as the user types a letter on a keyboard to provide an input), the profile presenter (125) determines a set of suggestions for the completion of the input in the entry box (203). The profile presenter (125) uses the incomplete input in the entry box (203) as a search criterion to find from the profile set (113) a set of suggestions for the complete address input. The suggestions are presented in the window (205) as a selectable list.

In one embodiment, when the message composer (121) has an existing, native mechanism for displaying suggestions (e.g., making suggestions based on address set (111)), the profile presenter (125) can be configured as an add-on module to display these suggestions as well and to hide the native mechanism of the message composer (121) for displaying suggestions.

In FIG. 4, the item (209) on the top of the list is highlighted; and the user may select the highlighted item (209) with a keystroke (e.g., pressing Tab key, Enter key, Home, End, PgUp, PgDown, etc.). The user may use the arrow keys to move the highlight up or down the list to highlight a different item, or provide additional input in the entry box (203) to cause the profile presenter (125) to update the suggestions in the window (205). The user may also use the cursor (207) to select an item using a cursor control, such as a mouse, a track ball, a touch pad, a touch screen, etc.

In one embodiment, when the message composer (121) has an existing, native mechanism that uses these keys for the display of suggestions, the profile presenter (125) configured as an add-on module can hide these keystrokes from the native mechanism.

In one embodiment, after an item is selected from the list presented in the suggestion window (205), the address represented by the item is inserted by the profile presenter (125) into the entry box (203) to replace the corresponding portion that is used to suggest the selected item; and the suggestion window (205) is closed automatically.

In some embodiments, the message composer (121) may be configured to perform post-processing, such as name checking, on the inserted text in the entry box (203) a few moments after the text has been inserted. The insertion by the profile presenter (125) is performed in a way that allows such post-processing by the message composer (121) to continue functioning. For example, if the message composer (121) loses focus or activation, it starts post-processing the entries in the textbox. The profile presenter (125) is configured to temporarily prevent this from happening while the suggestion window (205) is visible and causes this to happen when the suggestion window (205) is closed. To hide the suggestion window (205), the suggestion window (205) is configured as a topmost window that is initially not activated. The Outlook textbox window is subclassed via a code-injection mechanism to temporarily preventing it from getting "kill focus" messages (e.g., through intercepting such messages, and then throwing them away). After the suggestion window (205) becomes invisible, the profile presenter (125) sets the focus back to the textbox window and causes the post-processing to be performed.

For example, in FIG. 4, the incomplete input "Graf" is received in the entry box (203). The cursor "|" in the entry box (203) indicates the insertion point for subsequent keystrokes received in the user terminal (101). While the entry box (203) is expecting additional input from the user, the profile presenter (125) uses the incomplete input "Graf" to identify a set of suggestions, such as mgraf@gmail.com for Mary Graf, ericg@yahoo.com for Eric Grafstrom, graffiti@hotmail.com for Steve Curtis, graffiti@pacbell.net for SFPD, etc., based on the profile set (113) established by the profile builder (119).

In one embodiment, the suggestions are identified by matching the incomplete input with names, addresses and/or other profile data of the persons in the profile set (113). The incomplete input may match the beginning of a last name, the beginning of a first name, the beginning of the name of an organization, the beginning of a domain name of an email address, the beginning of the top level domain name of an email address, the beginning of the email prefix, the beginning of a word in the job title (or the beginning of the job title), the beginning of the city of the person, etc. In some embodiments, when an email prefix contains one or more separators, such as "_" or "." or "-", the email prefix is broken down into segments or chunks; and the incomplete input may match the beginning of any of the segments or chunks. When there is a match, the person can be selected as a candidate for the suggestions. Thus, the searching for a match is not limited to matching the beginning of an address that the user has previously typed for a previous outgoing message.

In FIG. 4, the top item, mgraf@gmail.com for Mary Graf, is highlighted and can be selected by pressing the Tab key or the Enter key. Alternatively, the user may select the second item, ericg@yahoo.com for Eric Grafstrom, by pressing a mouse button while the cursor (207) is over the second item. The profile presenter (125) is configured to use the selected address to replace the incomplete input "Graf" received in the entry box (203).

In FIG. 4, if the user further types a letter "f", the profile presenter (125) will use the incomplete input "Graff" to eliminate some suggestions (e.g., mgraf@gmail.com for Mary Graf, ericg@yahoo.com for Eric Grafstrom) and update the list in the suggestion window (205).

Thus, the profile presenter (125) uses the profile set (113) to identify suggestions based on incomplete input provided in the entry box (203) and to allow the user to select a suggestion to complete the input.

FIG. 4 illustrates an example in which the suggestion window (205) is presented to provide suggestions for the completion of an address input in the "To" field of the user interface (201) for composing an outgoing message. Similar suggestions can be provided when the user is typing in other fields that are configured to receive address inputs, such as the "Cc" field, or "Bcc" field, of a user interface for composing an outgoing email message. Further, the suggestions can be provided when the user is typing in other types of user interfaces that are configured to receive address inputs, such as a user interface to edit a contact entry, a profile page, etc. Thus, the invention is not limited to the user interface for composing an email message.

FIG. 5 illustrates another user interface to provide assistance in address input according to one embodiment.

In FIG. 5, the suggestions are presented as two parts. The part above the separator (211) is identified from the address set (111) and the part below the separator (211) is identified from the profile set (113).

In one embodiment, the address set (111) is generated by collecting the addresses that have been previously specified in the address fields of the message composer (121) of the user terminal (101). In one embodiment, the suggestion above the separator (211) is identified by matching the incomplete input "Graf" with the starting letters of the addresses in the address set (111). The addresses in the address set (111) that have the leading characters "graf" are selected to generate the suggestions above the separator (211).

In one embodiment, the message composer (121) has an existing, native mechanism for displaying suggestions (e.g., making suggestions based on address set (111)). The profile presenter (125) is configured to obtain the suggestions from the native mechanism (e.g., via scraping, inspecting, querying, etc.) and displays the suggestions above the separator (121).

In one embodiment, the suggestions presented above the separator (211) are identified by the message composer (121). The profile presenter (125) obtains the suggestions from the message composer (121), presents the suggestions in the suggestion window (205), hide the suggestions the message composer (121) would have shown (and thus prevents the message composer (121) from presenting the suggestions in a separate window).

In another embodiment, the profile presenter (125) shows the suggestions based on the profile set (113) in one suggestion window; the message composer (121) shows the suggestions in a different suggestion window; and the profile presenter (125) aligns its suggestion window with the suggestion window of the message composer (121) so that the two suggestion windows appear like two panels of a large window. Alternatively, the profile presenter (125) presents its suggestion window over the suggestion window of the message composer (121) (to cover up and thus effectively disable the suggestion window of the message composer (121)). In one embodiment, the profile presenter (125) causes the suggestion window of the message composer (121) to be invisible on subsequent invocations to hide the suggestion window of the message composer (121).

In another embodiment, the profile presenter (125) uses the address set (111) to identify the suggestions presented above the separator (211) in the suggestion window (205), using the same approach the suggestion window of the message composer (121) would use.

In one embodiment, the profile presenter (125) includes an auto suggest manager. The auto suggest manager can turn on or turn off the feature of auto suggestions generated based on the profile set (113) in accordance with the preferences of the user. The auto suggest manager provides encapsulation, providing an easy interface for external applications to use the auto suggest feature without understanding its implementation. It provides a mechanisms to add the auto suggest feature to a new window (message, contact, etc.), to "clean up" or remove the auto suggest feature from a window or all windows, to allow logging of auto suggest state and problems, and to determine any special preferences the user may have set in the native client (e.g., Outlook).

In one embodiment, the profile presenter (125) includes a suggestion window (205) that presents a dialog box or a list box to show the suggested results. The profile presenter (125) includes a view controller to show or hide the suggestion window (205). The view controller also positions the suggestion window (205) in the correct location (which varies as the user types in text), participates in "hiding" the suggestion window (205) from the native application (e.g., Outlook) so that the native application is not aware of the existence of the suggestion window (205), and notify other modules of navigation commands (PgUp, PgDown, etc.) and user selections. When a selection or keyboard command (e.g., arrow keys, tab return) related to the suggestions occurs, the suggestion window (205) (or a keyboard hook or the inspector controller, discussed below) provides messages to the view controller for processing.

In one embodiment, the profile presenter (125) further includes a result controller, which decides what results to show and when. After the profile presenter (125) detects that the user is typing in an address field (e.g., To, Cc, or Bcc fields of a window to compose an email), the result controller uses the incomplete input as a search criterion to search for the suggestions based on the profile set (113) and/or based on the address set (111). The view controller causes the display of the suggestion window (205) to show the search results. If the user selects a suggestion from the window (205), the address corresponding to the user selection is put into the address field.

In one embodiment, the profile presenter (125) is implemented as an add-on module for an existing communications client, such as Microsoft Outlook, which can make suggestions by selecting from the address set (111) the email addresses that start with the incomplete input typed by the user in the address field. The suggestion window (205) of the profile presenter (125) subclasses the suggestion window of the existing communications client; and the profile presenter (125) hides the suggestion window of the existing communications client and creates a keyboard hook as well as a subclass mechanism using code-injection to intercept keyboard messages and other messages sent to the hidden suggestion window of the existing communications client to prevent it from processing these keys (e.g. PgUp, PgDown, Tab, Return), and also to cause it to process fake keystrokes or other messages (e.g. to implement "delete" functionality"). In one embodiment, the keyboard hook is a global WH_KEYBOARD_LL hook; in another embodiment, the keyboard hook is a WH_KEYBOARD hook. In one embodiment, the profile presenter (125) creates only one such keyboard hook per thread (especially for the WH_KEYBOARD hook).

In one embodiment, the result controller is configured to handle a rapidly typing user, by stopping a previous search and then starting a new search. For example, if a search for suggestions is started based on the initial input "er" and before the suggestions are displayed the user further typed "ic" to provide the input "eric," the result controller stops the search for suggestions based on "er" and starts a new search for suggestions based on "eric."

In one embodiment, an inspector controller is used to hook the functionalities of the profile presenter (125) with the existing communications client, which may be the message composer (121) in one embodiment. When a window for the message composer (121) is constructed and shown, the inspector controller determines whether the user is typing in a field (e.g., entry box (203)) that is configured to receive an address. If the user is typing in an address field, the inspector controller instantiates a keyboard hook to obtain what the user types in the address field to allow the profile presenter (125) to generate the suggestions based on the profile set (113).

In one embodiment, the inspector controller determines if the window should have auto suggest functionality. Read-only windows or unsupported type of windows should not have the auto suggest functionality. The inspector controller then searches for suitable textboxes (using a "Control Calculation mechanism") that should have auto suggest functionality attached to them. Since the native client (e.g., Outlook) has many configurations ("use Word Editor," use "RTF Editor," etc.), different mechanisms are used and a fallback mechanism in case the initial search for a suitable window fails, and in some cases, additional code injection is required because the native client (e.g., Outlook) uses a different process for different windows. The inspector controller uses a "SetProp" mechanism to "remember" which windows have already been subclassed so that auto suggest functionality is correctly added to the newest window. Additionally, the inspector controller keeps track of which textbox (To, Cc, Bcc, etc.) the user is currently using. The inspector controller also is responsible for putting the user's selection (from the dialog) into the selected textbox control. The inspector controller also watches for various windows message in the various subclassed windows (e.g. Activation, Focus, Keyboard), "hiding" (or "eating") some of these message from the native client (e.g., Outlook) so as not to break other existing functionality of the native client (e.g., Outlook), and using others to notify the view controller that it should hide or show or change the suggestion window (205). In addition to the subclass of the "TextBox" and "Outlook AutoSuggest" window, the main composer window is subclassed as well, and may subclass others in the future. Note that this subclassing mechanism is implemented using code injection and could in the future also be implemented using other mechanisms. Code injection "injects" our code into another program (e.g. Outlook or Word) while it is running.

In one embodiment, the inspector controller subclasses the textbox (and also the parent window) into which the user is typing to receive the keys typed by the user, generate requests for new suggestions in response to keys typed by the user, scroll through the suggestions (e.g., when the user presses arrow keys), indicate a selection by the user (e.g., when the user presses Tab or Enter key) (some embodiments use subclass, some embodiments keyboard hook), the profile presenter (125) hide these keystrokes from the native client (e.g., Outlook window) (by "eating" or consuming the messages), and hide the suggestion window (205) when the keyboard focus is moved out of the textbox or user has activated another application or user has finished selection. The inspector controller instantiates the view controller to process the user input and subclasses the suggestion window of the message composer (121) to create the suggestion window (205). The inspector controller (or the keyboard hook) contacts the view controller to process the user inputs when various keys are received in the textbox in which the user is typing.

In one embodiment, a window driver is used to work with the message composer (121) to obtain current caret position (the position of the text insertion point indicator). In response to the requests from the inspector controller and the suggestion window (205), the window driver may selectively block messages from being passed on to other windows. When a selection is made, the window driver is configured to replace the incomplete input in the address field with the address corresponding to the selection.

In one embodiment, the profile presenter (125) is implemented as an add-on module to a native client, such as Outlook. The Outlook textbox windows are in some cases "rich edit controls" which allow other controls to be embedded in them. The profile presenter (125) walk both the text and these embedded COM controls using COM (also known as OLE or ActiveX programming) to determine where the user is currently entering text (ignoring any other text or embedded controls before or after the current email address) so that the profile presenter (125) can correctly determine where the current user's entry begins and ends, what text to use to create suggestions for, and also which part of the text (or embedded controls) to replace.

In one embodiment, the profile presenter (125) uses a person-centric approach to identify the suggestions. The partial input (e.g., "Graf" received in the entry box (203)) is used to match the names of the persons to identify the persons in the profile set (113) (e.g., the first name, the last name, the nickname, etc.). The profile presenter (125) sorts the matched persons based on a relationship score determined from the statistical data derived at least in part from the received messages (115) and the sent messages (117).

FIG. 6 shows a method to select suggestions to complete address input according to one embodiment.

In FIG. 6, after receiving (231) one or more letters that are typed in by an end user in an entry box configured to receive an address for an outgoing message, the profile presenter (125) determines (233) whether the one or more letters match part of a name in the profile set (113). If there is a match (or more than one match), the profile presenter (125) retrieves (235) the addresses associated with the matched name(s), sorts (241) the addresses, and presents (243) the addresses for selection in suggestion window (205).

In FIG. 6, if there is no name that matches the one or more letters, the profile presenter (125) determines (237) whether the one or more letters match part of an address in the profile set (113). If there is a match (or more than one match), the profile presenter (125) retrieves (239) the matched address(es), sorts (241) the addresses, and presents (243) the addresses for selection in suggestion window (205).

Thus, the user can input the names of the recipient to cause the profile presenter (125) to identify the persons with names matching the input to select the person and thus select the address of the person. The names of the recipient do not have to be part of the addresses to be matched and suggested.

In one embodiment, when a person has multiple addresses, the suggestion window (205) shows multiple suggestions for the addresses presented with the name of the person.

In another embodiment, when a person has multiple addresses, the suggestion window (205) shows one entry to suggest the person. If the person is selected, the suggestion window (205) is then updated to show a list of addresses of the person. If the user selects one or more addresses, the profile presenter (125) replaces the name of the person with the selected address(es) of the person; if the user does not select any of the multiple addresses, the profile presenter (125) replaces the name of the person with all of the multiple addresses. In one embodiment, if the user does not select any of the multiple addresses of the person, the profile presenter (125) replaces the name of the person with the top ranked address of the person in the To field and inserts the other addresses of the person in the Cc or Bcc field (or uses the top ranked address without using the other addresses of the person).

In FIG. 6, the profile presenter (125) attempts to first match names of the persons in the profile set (113) and, if there is no match in names, then match addresses of the persons in the profile set (113).

In another embodiment, the profile presenter (125) may perform a search to match the beginning of a number of fields in the profile set (113), such as, different fields of names of the persons in the profile set (113), different segments of email addresses of the persons in the profile set (113), the names of cities (or states or countries) of the persons in the profile set (113), different words in the street addresses of the persons in the profile set (113), different words of job titles of the persons in the profile set (113), screen names of the persons in the profile set (113), etc. Examples of different fields of names include first name, last name, middle name, nick name, etc. Examples of different segments of email addresses include segments or chunks of an email prefix separated by a separator, such as "-", ".", or "_", different levels of domain names of an email address, etc. In some embodiments, the names of the persons are as part of the email addresses. In some embodiments, the names are from fields separated from the email addresses.

When the profile presenter (125) searches different types of fields, a match in different types of fields may be weighted differently. For example, a match in a name field may be given a first weight (e.g., 10), a match in an email prefix segment may be given a second weight (e.g., 8), a match in the top level domain name may be given a third weight (e.g., 1), and a match in other domain names (e.g., second level domain name, or lower level domain names) may be given a fourth weight (e.g., 2), etc. When a person or an address has multiple matches in different fields, the weights for the multiple matches may be added to compute the weight for the person or address. Alternatively, the highest weight for the multiple matches can be selected as the weight for the person or address. The weights for the matched persons or addresses can be used to sort the persons or addresses for selection of up to a predetermined number of suggestions for presentation to the user. For example, the weights can be applied to the relevancy scores of the matched persons or addresses to determine relevancy scores for suggesting the persons or addresses; and the profile presenter (125) selects up to a predetermined number of matched persons or addresses that have the highest relevancy scores for suggesting the persons or addresses.

In FIGS. 4 and 5, the suggestions presented based on the profile set (113) are shown as a list of entries, where a typical entry includes the name and the address of the person. However, in other embodiments, the entries may further include other information, such as a photo image of the person, a job title of the person, a business association of the person, etc. In some embodiments, other details of the profile of the person are shown in a separate window when the cursor is positioned and remains positioned on the entry for the person (e.g., hovering over the entry).

In one embodiment, the profile presenter (125) ranks the persons for the suggestions to complete the address input, based on the relevancy index between the suggested persons and the user of the user terminal (101). When dealing with long lists of contacts, such a relevancy index helps users find the most relevant contacts first.

In one embodiment, the profile builder (119) scans the messages (115 and 117) to capture the addresses of the senders and recipients of the messages (115 and 117). Each of the captured addresses is stored in an index file. When one of those addresses is seen in a header that describes the recipients and senders, the score for the address is increased by a predetermined amount (e.g., 1). In some embodiments, the profile builder (119) further scans the body of the messages (115 and 117) to identify additional addresses.

In some embodiments, different weights/amounts are given to the score when the addresses are used in different fields (e.g., From, Reply-To, To, Cc, and Bcc fields of emails). For example, an amount of 3 may be given to the score when an address is found in a field that identifies the sender of the message (e.g., From or Reply-To fields of emails received by the user of the user terminal (101)); and an amount of 1 may be given to the score when the address is found in a field that identifies the recipient of the message (e.g., To, Cc, and Bcc fields of emails sent from the user of the user terminal (101)).

In some embodiments, the same amount is given to the score regardless of the type of fields in which the address is used (e.g., From, Reply-To, To, Cc, and Bcc fields of emails).

In some embodiments, the length of the elapsed time period since receipt of the message is further used to determine the amount given to the score. The occurrence of an address in a recent message can be given more weight than the occurrence of the address in a message received/sent earlier than the recent message.

Thus, after the messages (115 and 117) are processed, each of the addresses has a relevancy score. The higher the score, the more relevant the address is to the user of the user terminal (101).

In some embodiments, the relevancy score is computed from the data in the profile (131), such as the total number of messages received from the person (148), the total number of messages sent to the person (149), etc. In some embodiments, the number of messages are counted based on the types of fields in which the addresses appear and the time periods in which the messages are sent or received.

In one embodiment, the profile builder (119) further groups the addresses by the names of the corresponding persons. Each person having a name in the profile set (113) may have one or more addresses. In one embodiment, the scores for the addresses of the person are summed to generate a score for the person. Thus, the higher the score, the more relevant the person is to the user of the user terminal (101).

In one embodiment, when the suggestions are presented as a list of addresses, the scores for the addresses are used to sort the addresses. When the suggestions are presented as a list of persons, the scores for the persons are used to sort the list of names of the persons.

In another embodiment, the suggestions are presented as a list of addresses grouped according to the persons. The addresses for each person are grouped together and sorted within the group based on the scores of the emails. The groups are sorted according to the scores of the persons.

In one embodiment, the profile presenter (125) selects up to a predetermined number (e.g., 10) of candidates, after sorting the candidates for the suggestions based on the relevancy scores. The selected candidates are presented in the suggestion window (205) to help the user. Less relevant candidates are not presented in the suggestion window (205).

While some of the embodiments are discussed here in the context of composing an email message, the techniques disclosed here can also be applied to the specifying of address information for instant messaging, text messaging, dialing a phone number, etc. Instead of matching the incomplete input to the exact address, the profile presenter (125) can match the incomplete input with identifiers of the persons in the profile set (113) to identify the persons as the basis for suggestions. Examples of identifiers include nickname, first name, last name, company name, domain name, user name, screen name, phone number, etc. In one embodiment, the suggestions are searched and presented in the form of suggested persons and thus, the suggestions are person-centric.

In some embodiments, the user terminal (101) may include different communication components that require address information for different types of communications, such as email, instant messages, text messages, phone calls, etc. The profile presenter (125) may use the profile set (113) to generate the suggested candidates for completing an address input for the different types of communications.

In some embodiments, the relevancy score is computed for the person without considering the type of communications. In other embodiments, the addresses having the same type as the address to be suggested are given more weight than other types of addresses. For example, when ranking the persons for suggesting addresses for instant messaging, the addresses for instant messaging may be given more weight than addresses for other types of communications, such as email, phone calls, etc. Thus, for different types of communications, the profile presenter (125) may suggest different lists of persons based on the same profile set (113) and the same incomplete input.

Figure 7:
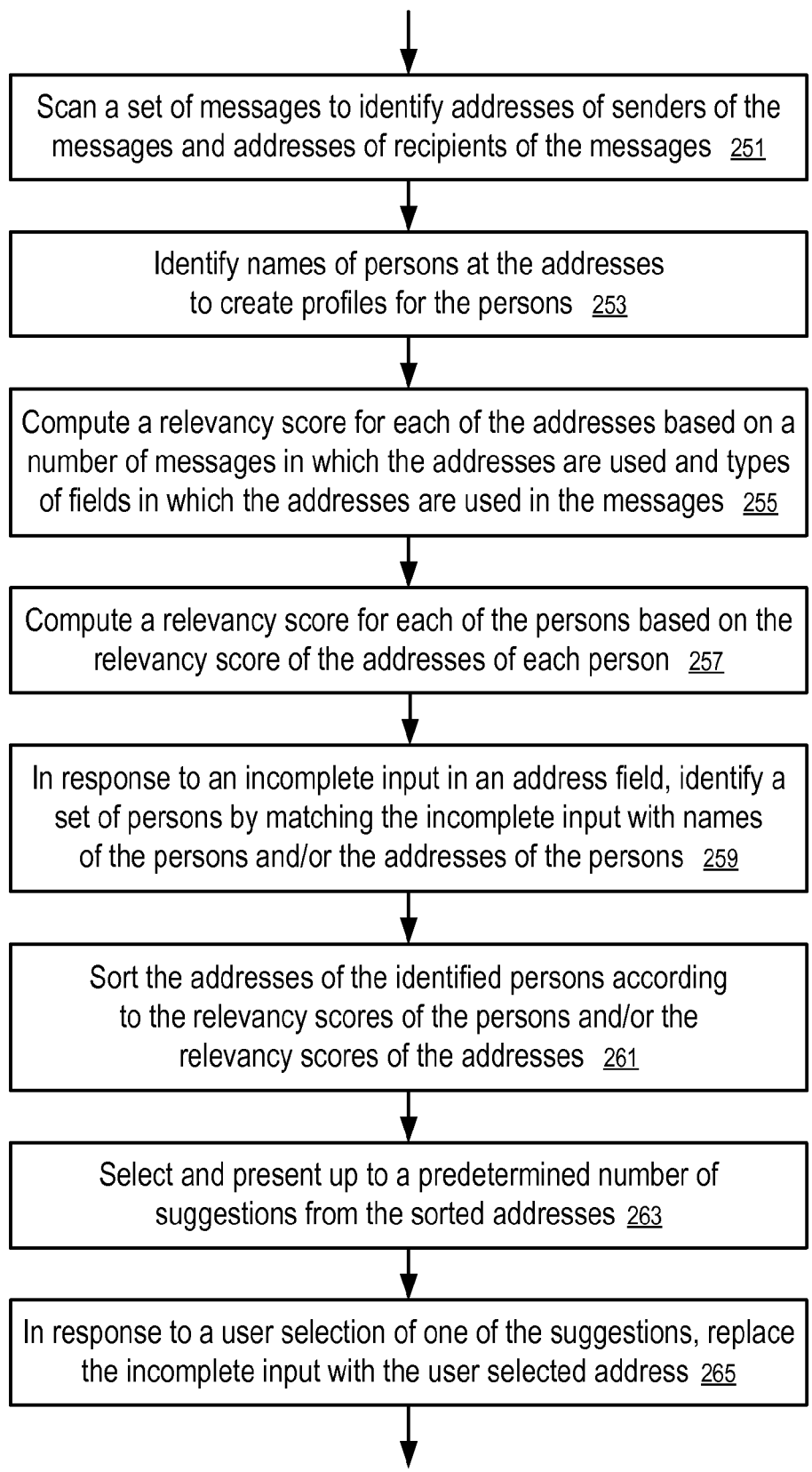
FIG. 7 shows a method to provide address assistance according to one embodiment.

FIG. 7 shows a method to provide address assistance according to one embodiment. In FIG. 7, the profile builder (119) scans (251) a set of messages (115 and 117) to identify addresses of senders of the messages and addresses of recipients of the messages in an automatic way, for example, when the profile builder (119) is installed and/or when the messages (115 and 117) are received or sent.

The profile builder (119) identifies (253) the names of persons at the addresses to create profiles (131) for the persons, based on scanning the messages (115 and 117) and/or querying other data sources in an automated way, such as the web search engine (163), online directory (164), social network server (165), and other websites.

In one embodiment, the profile builder (119) computes (255) a relevancy score for each of the addresses based on a number of messages in which the addresses are used and types of fields in which the addresses are used in the messages. For example, instances where an address is used to specify a recipient of a message sent from the user of the user terminal (101) may be given more weight than instances where the address is used to specify a sender of a message received by the user of the user terminal (101).

In one embodiment, the profile builder (119) also computes (257) a relevancy score for each of the persons based on the relevancy score of the addresses of each person.

In FIG. 7, in response to an incomplete input in an address field, the profile presenter (125) identifies (259) a set of persons by matching the incomplete input with names of the persons and/or the addresses of the persons. The profile presenter (125) sorts (261) the addresses of the identified persons according to the relevancy scores of the persons and/or the relevancy scores of the addresses, and selects and presents (263) up to a predetermined number of suggestions from the sorted addresses. In response to a user selection of one of the suggestions, the profile presenter (125) replaces (265) the incomplete input with the user selected address.

Figure 8:
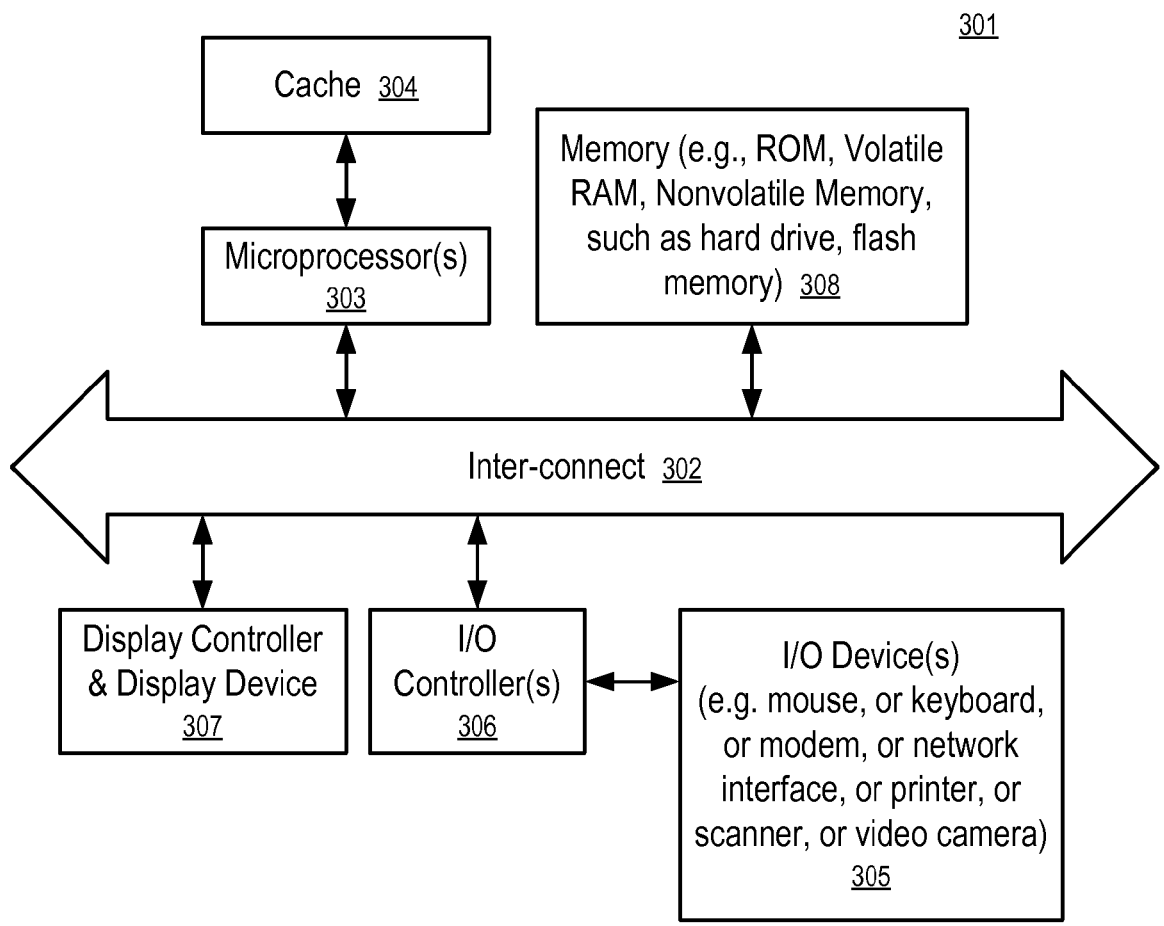
FIG. 8 shows a data processing system, which can be used in various embodiments.

FIG. 8 shows a data processing system, which can be used in various embodiments (e.g., as user terminal (901) or (902), or remote server (920) or application servers (922, 924)). While FIG. 8 illustrates various components of a computer system, it is not intended to represent any particular architecture or manner of interconnecting the components. Some embodiments may use other systems that have fewer or more components than those shown in FIG. 8.

In one embodiment, the user terminal (101) can be implemented as a data processing system, with fewer or more components, as illustrated in FIG. 8. When one or more components of the user terminal (101) are implemented on one or more remote servers, the servers can be implemented as a data processing system, with fewer or more components, as illustrated in FIG. 8.

In FIG. 8, the data processing system (301) includes an inter-connect (302) (e.g., bus and system core logic), which interconnects a microprocessor(s) (303) and memory (308). The microprocessor (303) is coupled to cache memory (304) in the example of FIG. 8.

The inter-connect (302) interconnects the microprocessor(s) (303) and the memory (308) together and also interconnects them to a display controller, display device (307), and to peripheral devices such as input/output (I/O) devices (305) through an input/output controller(s) (306).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (302) may include one or more buses connected to one another through various bridges, controllers and/or adapters. In one embodiment, the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any apparatus that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
    scanning, by a first user terminal, a set of messages to identify a plurality of primary persons addressed in the messages as a primary recipient and a plurality of secondary persons addressed in the messages as a secondary recipient;
    building person profiles for each of the primary persons and each of the secondary persons;
    computing scores of the primary persons to determine a relevancy of each primary person to a user of the first user terminal;
    mapping, by the first user terminal, the primary persons to a plurality of friends and the secondary persons to a plurality of other persons;
    defining, by the first user terminal, a first social network model based on the friends and the other persons, wherein the model comprises a friends category including the friends and an all category including the friends and the other persons;
    selecting persons for the friends category of the first social network model based on the scores;
    storing, by the first user terminal, the first social network model;
    receiving, by the first user terminal, a request from a gadget running on a second user terminal, the second user terminal storing a second social network model that is different from the first social network model;
    in response to the request from the gadget, providing access to friend data for the primary persons as defined by the first social network model, the gadget to provide services based on the friend data for a relevant context, the friend data being different for each context in which the services are provided, and the access exposing friend data for a top-ranked number of the primary persons based on the relevancy of the primary persons to the user as determined by the scores; and
    sending, from the first user terminal, the friend data to the second user terminal, the friend data comprising data from the person profiles for the top-ranked primary persons.

2. The method of claim 1, wherein each primary recipient is listed in a To field of an email, and each secondary recipient is listed in a Cc or Bcc field of an email.

3. The method of claim 1, wherein the mapping of the primary persons is performed without manual input from the user regarding each of the friends.

4. The method of claim 1, further comprising implementing the first social network model with a set of common application programming interfaces (APIs) for a web-based social network application.

5. The method of claim 4, wherein the set of APIs is implemented as an OpenSocial container.

6. The method of claim 4, further comprising hosting the set of APIs on the first user terminal.

7. A user terminal, comprising:
    a storage device to store a set of messages and to store a first social network model;
    a network builder to scan the set of messages to identify a plurality of primary persons addressed in the messages as a primary recipient and a plurality of secondary persons addressed in the messages as a secondary recipient, to map the primary persons to a plurality of friends and the secondary persons to a plurality of other persons, to build person profiles for each of the primary persons and each of the secondary persons, and to compute scores of the primary persons to determine a relevancy of each primary person to a user of the user terminal; and at least one processor configured to:

define the first social network model based on the friends and the other persons, the model comprising a friends category including the friends and an all category including the friends and the other persons;

select persons for the friends category of the first social network model based on the scores;

receive a request from a gadget running on a different user terminal, the different user terminal storing a second social network model that is different from the first social network model;

in response to the request from the gadget, provide access to friend data for the primary persons, the gadget to provide services based on the friend data for a relevant context, the friend data being different for each context in which the services are provided, and the access exposing friend data for a top-ranked number of the primary persons based on the relevancy of the primary persons to the user as determined by the scores; and send the friend data to the different user terminal, the friend data comprising data from the person profiles for the top-ranked primary persons.

8. A non-transitory machine readable storage media storing a set of instructions, the instructions to cause at least one processor to:

scan, by a first user terminal, a set of messages to identify a plurality of primary persons addressed in the messages as a primary recipient and a plurality of secondary persons addressed in the messages as a secondary recipient;

build person profiles for each of the primary persons and each of the secondary persons;

compute scores of the primary persons to determine a relevancy of each primary person to a user of the first user terminal;

map, by the first user terminal, the primary persons to a plurality of friends and the secondary persons to a plurality of other persons;

define, by the first user terminal, a first social network model based on the friends and other persons, wherein the model comprises a friends category including the friends and an all category including the friends and other persons;

select persons for the friends category of the first social network model based on the scores;

store, by the first user terminal, the first social network model;

receive, by the first user terminal, a request from a gadget running on a second user terminal, the second user terminal storing a second social network model that is different from the first social network model;

in response to the request from the gadget, provide access to friend data for the primary persons, the gadget to provide services based on the friend data, the friend data being different for each context in which the services are provided, and the access exposing friend data for a top-ranked number of the primary persons based on the relevancy of the primary persons to the user as determined by the scores; and send, from the first user terminal, the friend data to the second user terminal, the friend data comprising data from the person profiles for the top-ranked primary persons.

* * * * *